US008458045B1

(12) United States Patent
Chan

(10) Patent No.: US 8,458,045 B1
(45) Date of Patent: *Jun. 4, 2013

(54) ELECTRONIC AUCTION PROCESSING AND DATABASE SYSTEM

(71) Applicant: AC Holding Company L.L.C., San Jose, CA (US)

(72) Inventor: Alex H Chan, San Francisco, CA (US)

(73) Assignee: AC Holding Company, L.L.C., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/645,376

(22) Filed: Oct. 4, 2012

Related U.S. Application Data

(62) Division of application No. 12/868,719, filed on Aug. 25, 2010, now Pat. No. 8,326,693.

(60) Provisional application No. 61/236,531, filed on Aug. 25, 2009.

(51) Int. Cl.
*G06Q 30/00* (2012.01)
(52) U.S. Cl.
USPC ......... 705/26.1; 705/26.4; 705/37; 705/14.64
(58) Field of Classification Search
CPC ....................................................... G06Q 30/00
USPC ............................... 705/26.1, 26.4, 37, 14.64
See application file for complete search history.

(56) References Cited

U.S. PATENT DOCUMENTS

| | | | |
|---|---|---|---|
| 7,124,109 B2* | 10/2006 | Sakamoto et al. | 705/37 |
| 7,152,042 B1 | 12/2006 | Arkes | |
| 7,599,857 B2* | 10/2009 | Bishop et al. | 705/50 |
| 7,925,541 B2 | 4/2011 | Bocheck | |
| 2002/0065757 A1 | 5/2002 | Lam | |
| 2002/0165817 A1 | 11/2002 | Rackson et al. | |
| 2002/0174054 A1 | 11/2002 | Grey et al. | |
| 2003/0041004 A1 | 2/2003 | Parry et al. | |
| 2003/0041005 A1 | 2/2003 | Parry et al. | |
| 2004/0193489 A1* | 9/2004 | Boyd et al. | 705/14 |
| 2005/0234802 A1 | 10/2005 | Zhang et al. | |
| 2006/0004645 A1 | 1/2006 | Andersson | |
| 2007/0027792 A1 | 2/2007 | Smith | |
| 2007/0073610 A1 | 3/2007 | Marugabandhu et al. | |
| 2007/0087822 A1* | 4/2007 | Van Luchene | 463/25 |
| 2007/0192784 A1* | 8/2007 | Postrel | 725/23 |
| 2008/0046336 A1 | 2/2008 | Mosleh | |
| 2008/0103938 A1 | 5/2008 | Fisher et al. | |
| 2008/0120160 A1 | 5/2008 | Woo et al. | |
| 2008/0201252 A1 | 8/2008 | Ingraselino et al. | |

(Continued)

OTHER PUBLICATIONS http://www.barterguest.com.

*Primary Examiner* — Yogesh C Garg
(74) *Attorney, Agent, or Firm* — Alex H. Chan

(57) ABSTRACT

Systems, methods and computer program products for processing inputs of various formats to be used in an auction are described. In some implementations, a conversion application can be used to assist a user in setting a conversion ratio by which a service can be valued (e.g., for converting values between commercial and proprietary currency). In some implementations, a cash value of the service to be rendered can be defined. In these implementations, the conversion application can facilitate the determination of an appropriate conversion ratio by which the cash value can be converted to other currency value (e.g., to other proprietary currency).

16 Claims, 19 Drawing Sheets

U.S. PATENT DOCUMENTS

| | | | |
|---|---|---|---|
| 2009/0150237 A1* | 6/2009 | Gupta et al. | 705/14 |
| 2009/0318221 A1* | 12/2009 | Dhunjishaw et al. | 463/29 |
| 2010/0241530 A1* | 9/2010 | Murset | 705/27 |
| 2010/0332339 A1 | 12/2010 | Patel et al. | |
| 2011/0099037 A1 | 4/2011 | Levin et al. | |
| 2011/0153403 A1* | 6/2011 | Postrel | 705/14.29 |
| 2011/0238514 A1 | 9/2011 | Ramalingam et al. | |
| 2011/0320302 A1 | 12/2011 | Seriani | |

\* cited by examiner

Which service would you like to trade for? [Select your service] >

542
Is your service worth more, ess or the same as this service?
● More  ○ Less  ○ Same If my service is worth more than the seller's service, I would like the seller to:
☐ pay difference in cash
☐ pay difference in TradeGig points
☐ pay difference in cash and TrageGig point with a minimum of [Enter Value] in cash 544
[Please enter any other comments or additional terms of trade to the seller]

[Negotiate New Terms]

Trade Steps
1 I place bid | 2 | 3 | 4 | 5 | 6 | 7 | 8

If you ever have and issue regarding your service, we want to know about it. If you don't tell us about your problems, we won't be able to prevent a service buyer or a service seller from doing the same again.

If you have a problem with a buyer who bought your service:

1. Identify the issue
2. Learn more about what information is available
3. Find out what you can do about it.

What's the issue? | What information is available? | What can you do about it?

Feedback abuse

A buyer includes your phone number, address, or profane language in Feedback comment. Learn more about Feedback Abuse, Resolving Feedback Problems and Requesting Feedback Revision.
Contact us

Feedback extortion

A buyer threatens to leave negative or neutral Feedback, or low detailed seller ratings (DSRs) for you unless you provide services not included in your original listing.
Learn more about Feedback extortion
Contact us Send is the email you received.

Unwelcome bidding or buying

A buyer is bidding on your service just to leave you negative Feedback. Learn more about unwelcome and malicious buying
Select buyer requirements to block buyers who don't meet certain criteria
Require immediate payment on Buy Now service listings.
Place the member on your blocked bidder/buyer list.
Cancel bids

Problems with a Buyer Protection case

You're trying to resolve a problem with a buyer using our Resolution Center and the buyer is abusing the process.
Learn more about resolving transaction problems in the resolution center.
Report it

Feedback manipulation

A buyer includes your phone number, address, or profane language in Feedback comment. Learn more about Feedback Abuse, Resolving Feedback Problems and Requesting Feedback Revision.
Contact us

Unpaoid Service

A buyer didn't pay for your service
Find out what to do when a buyer doesn't pay.
If you can't work it out by communicating with your buyer, you can open a case in our Resolution Center

Custom fraud

A buyer asks you to provide false information on a customs declaration form. Learn more about encouraging illegal activity.
Contact us

Another Problem

Get help with other TradeGig transaction problems or safety concerns. Learn more about resolving selling problems.
Contact us

ELECTRONIC AUCTION PROCESSING AND DATABASE SYSTEM

CROSS-REFERENCE TO RELATED APPLICATIONS

This application is a divisional application of and claims the benefit of priority to U.S. application Ser. No. 12/868,719 titled "ELECTRONIC AUCTION PROCESSING AND DATABASE SYSTEM," filed on Aug. 25, 2010, which claims the benefit of priority to U.S. Provisional Application Ser. No. 61/236,531 titled "SERVICE TRADING DATABASE SYSTEM," filed on Aug. 25, 2009, the disclosure of each of which is incorporated herein by reference in its entirety.

TECHNICAL FIELD

The subject matter of this application is generally related to data processing.

BACKGROUND

Auctions have been traditionally conducted in the physical presence of a number of persons interested in obtaining certain goods or services. Auctions are typically preceded by an offering, for example, through distribution of a catalog, such that the interested persons can pre-determine which goods or services appear interesting and the purchase price such person is willing to offer. Such auctions have the disadvantage of being slow and tedious, and not consistently directed to a good or service of interest. Additionally, many potential bidders are often precluded from participating in traditional auctions because physical presence is often advantageous or required.

Most recently, the advent of computer-based auctions has improved the traditional auction format by accelerating the bidding process, allowing buyers, sellers, bidders and service providers to electronically search and focus only on goods or services of interest, and allowing persons to participate in auctions from any location having a networked computer. Accordingly, users participating in online auctions can now compete for goods and services of interest from a convenient location during any convenient time of day, allowing online auctions to be available to a wider, more diverse population.

Unfortunately, however, the currently available auction formats require an expenditure of monetary currency in order to successfully compete for a particular good or service. Additionally, goods or services which are auctioned online typically command high monetary currency values. Thus, these auctions are exclusive of those persons having a lack of, or limited amount of, monetary currency.

SUMMARY

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5D is an exemplary screenshot of a first portion of a tradeable page.
FIG. 5E is an exemplary screenshot of a second portion of the tradeable page shown in FIG. 5D.
FIG. 5F is an exemplary screenshot of a dispute resolution page.
FIG. 5G is an exemplary screenshot of a service summary page.
FIG. 5H is an exemplary screenshot of a search results page.
FIG. 5I is an exemplary screenshot of a service listing.
FIG. 5J is an exemplary screenshot of a buy-now page.
FIG. 5K is an exemplary screenshot of a service summary page.
FIG. 5L is an exemplary screenshot of a feedback page.

Like reference symbols in the various drawings indicate like elements.

DETAILED DESCRIPTION

System Overview

Figure 1A:
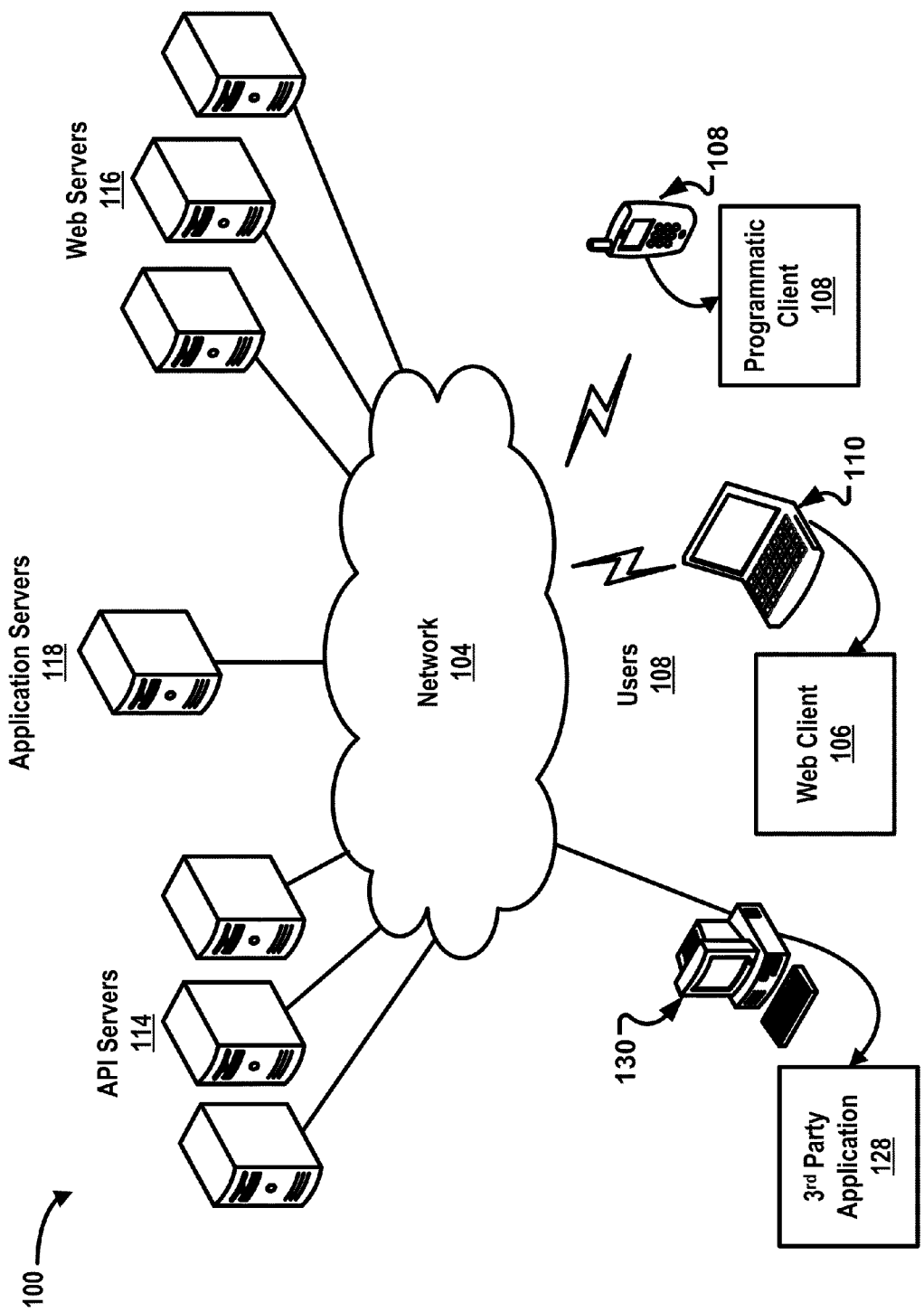
FIG. 1A shows an example of a client-server system.
Figure 1B:
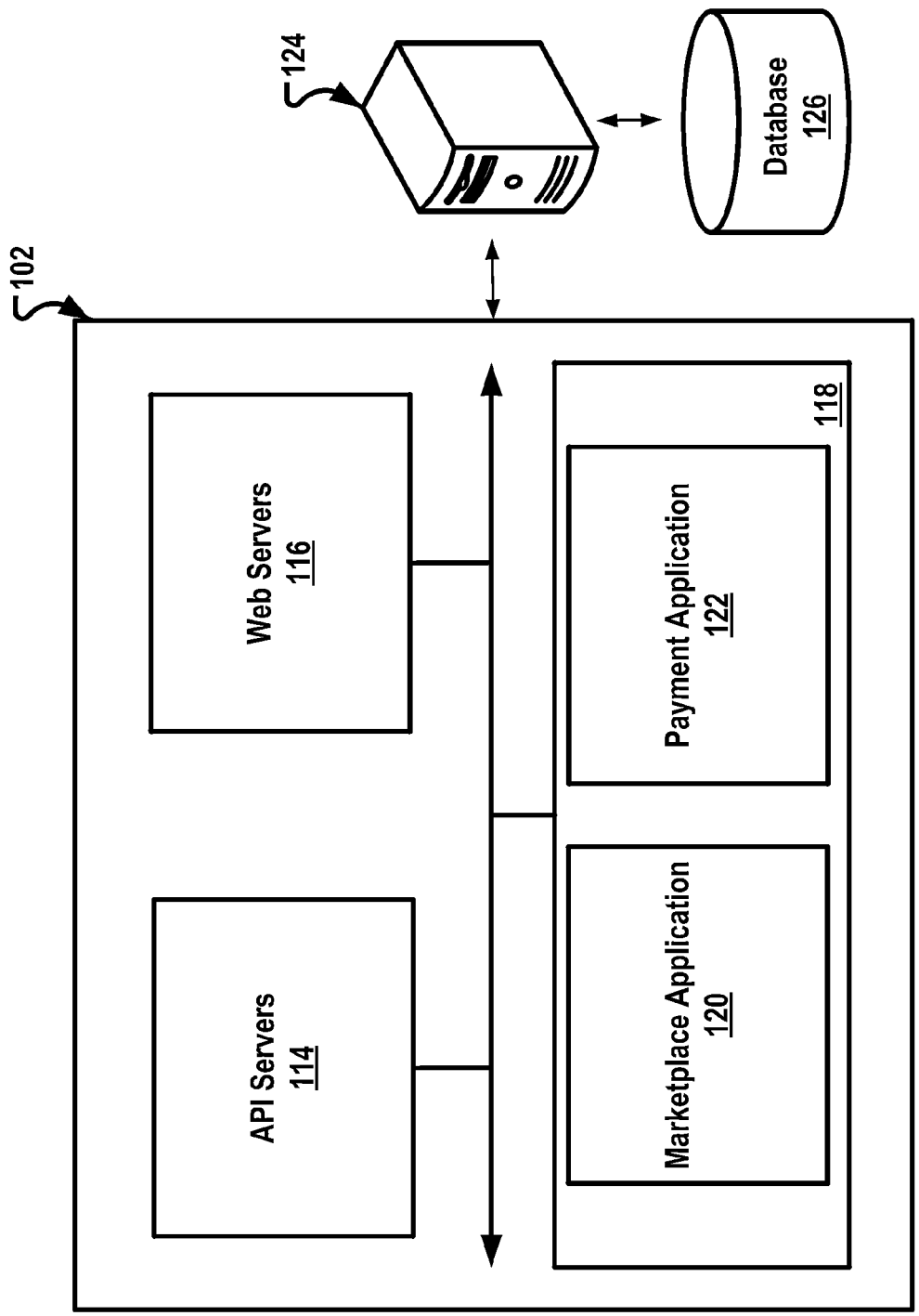
FIG. 1B shows components of a networked system of the client-server system shown in FIG. 1A

FIG. 1A shows an example of a client-server system 100, and FIG. 1B shows the components of a networked system 102 of the client-server system 100. As shown in FIG. 1A, the client-server system 100 includes a networked system 102 (e.g., a network-based marketplace, publication system, auctioning system, and the like) that provides server-side functionality via a network 104 (e.g., the Internet or Wide Area Network (WAN)) to one or more clients. As shown, the networked system 102 can include one or more clients including a first client 110 (e.g., hosting a web client 106 through a browser), a second client 112 (e.g., hosting programmatic client 108 executing on respective client machines), and a third client 130 (e.g., hosting $3^{rd}$ party application(s) 128).

The networked system 102 can also include a database 126 (FIG. 1B) for maintaining transactional information associated with a service for auction, the bids, and other relevant information in a commercially available database system.

The transaction information can include system inventory (e.g., inventory of available services currently offered to various users, buyers, bidders and third parties) with a number of inventory accounts, an images collection, and advertising data. The inventory accounts can enable a seller or service provider to manage inventory and list services through the networked system 102. Advertisements with identifiers can be created for services that are listed for sale within the networked system 102. A service catalog can be created by use of the networked system 102 and can be utilized to obtain additional information regarding services listed.

A service provider can include any individual, business, entity, group, charity, government organization, software and/or hardware suitably configured to offer services for sale within an auctioning environment in return for cash or points (which can be exchanged for monetary value). The services can be offered in an online auction via the networked system 102 such that consumers offer to purchase a service using points as cash for payment to the service provider. The service provider can be a third party who interacts with the networked system 102 using one of the clients 110, 112 and 130.

A buyer, seller, bidder and trader can include any individual, business, entity, group, charity, software and/or hardware that desires to participate in the networked system 102 to obtain or offer services in exchange for cash or points obtained.

Transactional information for the networked system 102 can be retained in the database 126 (e.g., via database server(s) 124 shown in FIG. 1B). In some implementations, database searches within the database 126 can be performed periodically to check for new services to be made visible to potential buyers or bidders. Such periodic searching allows an individual charged with maintaining this system to load relevant information into the database 126 at any time. In some implementations, the database server 124 and/or the database 126 can be integrated into the networked system 102. Alternatively, the database server 124 and/or the database 126 can be external components to the networked system 102.

Once the database 126 is loaded with information about the service(s) scheduled for presentation to potential buyers and bidders, the networked system 102 can take the service information and create a readable service listing (e.g., a bidding page through which bidders can post bids, or a service page through which a particular service can be bought immediately) for viewing over the network 104. Buyers and bidders can then view the new service being auctioned off and place their bids, or alternatively, purchase the new service to be rendered at a specific time and date specified by the service provider or seller. These service listings can, in some implementation, present information associated with the current highest bid, bid increment, quantity available, service description, images showing the service or work product associated with the service to be rendered, professional license information, peer review or user feedback (e.g., user rating and user comments), professional ratings (e.g., BBB (Best Business Bureau ratings)), exchange formula (e.g., where a formula is set for determining the appropriate amount of points that can be used for purchasing a particular service as will be discussed below), and the like. In addition, these service listings also can specify information such as proof of insurance and/or bonding; the company name and name of the employee providing the service, legal status and operation history, and/or insurance company information that can be verified online in real or substantially real time, and the like.

In some implementations, the networked system 102 can include or be in communication with an API server 114, a web server 116 and an application server(s) 118. In some implementations, the application server 118 can include a marketplace application(s) 120 and payment application(s) 122. The marketplace application 120 can provide a number of marketplace functions and services to users that access the networked system 102. The payment application 122 can likewise provide a number of payment services and functions to users. The payment application 122 can allow users to accumulate value (e.g., in a commercial currency, such as the U.S. dollar, or a proprietary currency, such as "points") in accounts, and then later to redeem the accumulated value for services (to be discussed in greater detail below) that are made available via the marketplace application 120.

While the payment application 122 is shown in FIG. 1 as being integrated with the networked system 102, it will be appreciated that the payment application 122 can also be a separate payment service provided by a third party vendor. Further, while the client-server system 100 shown in FIG. 1 employs a client-server architecture, the client-server system 100 is not limited to such an architecture, and can also be applied to distributed, peer-to-peer, or similar architecture system. The various marketplace and payment applications 120 and 122 also can be implemented as standalone software programs, which do not necessarily have networking capabilities.

In some implementations, the web client 106 can access the marketplace and payment applications 120 and 122 via a web interface supported by the web server 116. Similarly, the programmatic client 108 can access the various services and functions provided by the marketplace and payment applications 120 and 122 via the programmatic interface provided by the API server 114. The programmatic client 108 can, for example, be a seller application to enable sellers or service providers to author and manage listings (e.g., notices of the availability of services for sale or auction) on the networked system 102 in an off-line manner, and to perform batch-mode communications between the programmatic client 108 and the networked system 102.

The third party application 128 executing on the third party server 130 can also have programmatic access to the networked system 102 via the programmatic interface provided by the API server 114. For example, the third party application 128 can utilize information retrieved from the networked system 102 to support one or more features or functions on a website hosted by the third party. The third party website can, for example, provide one or more promotional, marketplace or payment functions that can be supported by the relevant applications of the networked system 102.

Exemplary Applications

Figure 2:
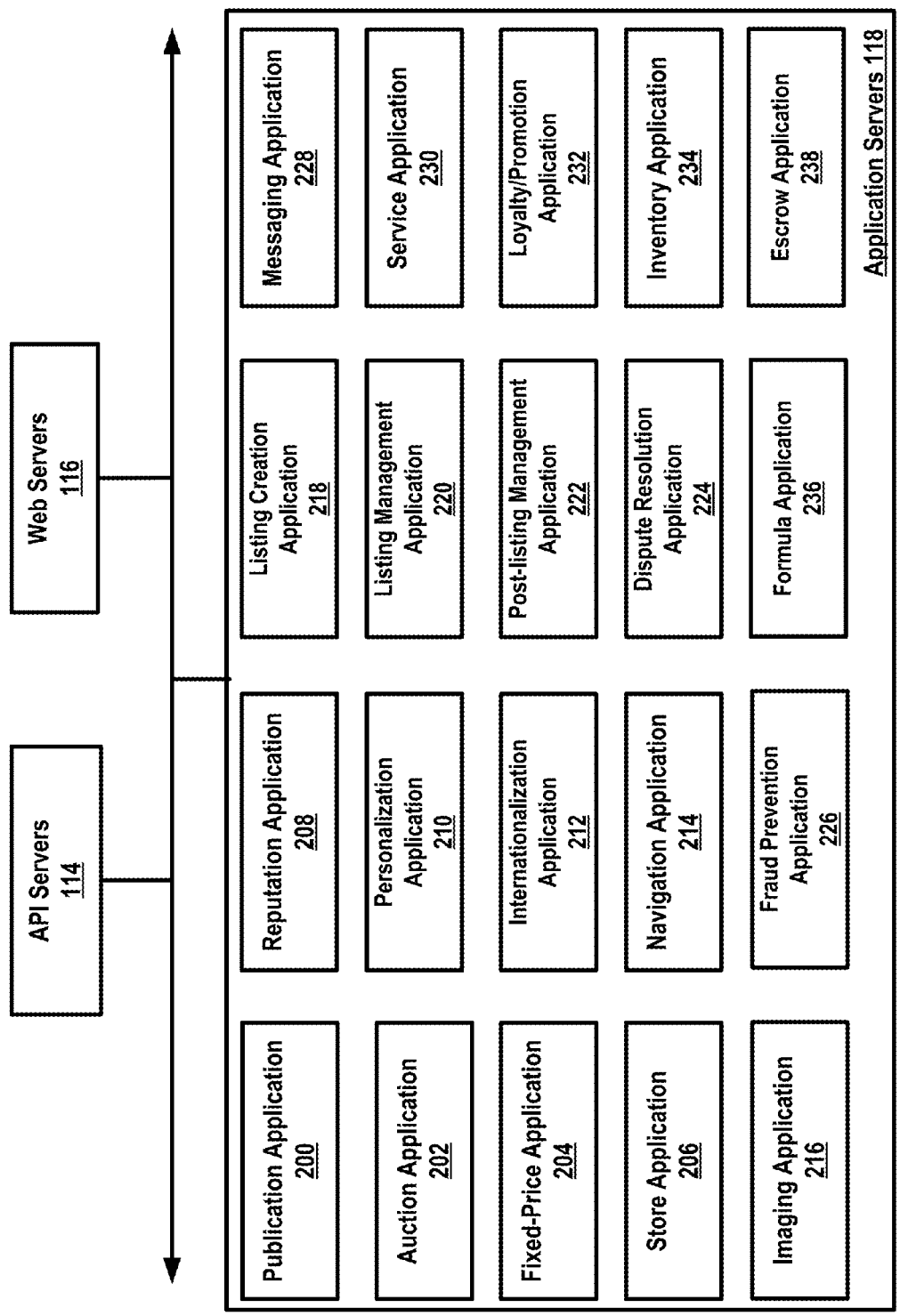
FIG. 2 shows a block diagram illustrating multiple applications that can be provided by an application server.

FIG. 2 shows a block diagram illustrating multiple applications that can be provided by the application server 118, which can execute the marketplace and payment applications 120 and 122. The marketplace and payment applications 120 and 122 can be hosted by on the application server 118, or on a dedicated or shared server that can be communicatively coupled to the networked system 102 to enable communications between such servers. The marketplace and payment applications 120 and 122 themselves can be communicatively coupled (e.g., via appropriate interfaces) to each other and to various data sources so as to allow information to be passed between the applications or to share and access common data. The marketplace and payment applications 120 and 122 can furthermore access one or more databases 126 via the database servers 128 for executing a particular application or retrieving data when presenting the application.

In some implementations, the networked system 102 can provide a number of publishing, listing and price-setting mechanisms whereby a seller (or trader) can list a service for sale, a buyer or bidder can express interest in or indicate a desire to purchase such a service, and a price can be set for a transaction pertaining to the service.

Referring to FIG. 2, the application server 118 can include various applications 200-236 each of which can communicate with other applications, the API server 114 and the web server 116. Specifically, the application server 118 can include, without limitation, a publication application 200, an auction application 202, a fixed-price application 204, a store application 206, a reputation application 208, a personalization application 210, an internationalization application 212, a navigation application 214, an imaging application 216, a listing creation application 218, a listing management application 220, a post-listing management application 222, a dispute resolution application 224, a fraud prevention application 226, a messaging application 228, a service application 230, a loyalty/promotion application 232, an inventory application 234, and a formula application 236.

As shown, the publication application 200 and an auction application 202 can be used to support auction-format listing and price setting mechanisms (e.g., English, Dutch, Vickrey, Chinese, Double, Reverse auctions etc.). The auction application 202 can also provide a number of features in support of such auction-format listings, such as a reserve price feature whereby a seller can specify a reserve price in connection with a listing and a proxy-bidding feature whereby a bidder can invoke automated proxy bidding.

The fixed-price application 204 can be used to support fixed-price listing formats (e.g., the traditional classified advertisement-type listing or a catalogue listing) and buyout-type listings. Specifically, buyout-type listings (e.g., Buy-It-Now option) can be offered in conjunction with auction-format listings, and allow a buyer to purchase services (or bidder to bid on the services via an auction) for a fixed-price that can be higher than the starting price of an auction.

The store application 206 can be used to allow a seller or service provider to group service listings within a "virtual" store, which can be branded and otherwise personalized by and for the seller or service provider. Such a virtual store can also offer promotions, incentives and features that are specific and personalized to a relevant seller.

The reputation application 208 can be used to allow users (whether buyers, sellers, service providers or bidders) to establish, build and maintain reputations, which can be made available and published to other potential buyers, sellers, bidders and service partners. For example, in a person-to-person trading (e.g., where one service provider or seller would like to trade or swap services with another service provider), one of the users might not have trading, buying or selling history or other reference information whereby the trustworthiness and credibility of potential trading partners can be assessed by the other user. The reputation application 208 allows a user, for example through feedback provided by other transaction partners, buyers, sellers, or bidders, to establish a reputation within the networked system 102 over time. Other potential trading partners, buyers, sellers, or bidders can then reference such a reputation for the purposes of assessing credibility and trustworthiness.

The personalization application 210 can be used to allow users of the networked system 102 to personalize various aspects of their interactions with the networked system 102. For example, the personalization application 210 can allow a user to create a personalized selling page (e.g., for a seller looking to offer a particular type of service), buying page (e.g., for a buyer looking for a specific service), or trading page (e.g., for a user looking to trade an existing service with another user whose service is also currently listed) at which information regarding transactions to which the user is (or has been) a party can be viewed. Further, the personalization application 210 can enable a user to personalize listings and other aspects of their interactions with the networked system 102 and other parties.

In some implementations, the networked system 102 can support a number of marketplaces that can be customized for specific geographic regions. For example, a version of the networked system 102 can be customized for the United Kingdom, whereas another version of the networked system 102 can be customized for the United States. Each of these versions can operate as an independent marketplace, or can be customized (or internationalized and/or localized) presentations of a common underlying marketplace. The networked system 102 can accordingly include a number of internationalization applications 212 configured to customize information (and/or the presentation of information) by the networked system 102 according to one or more predetermined criteria (e.g., geographic, demographic or marketplace criteria). For example, the internationalization application 212 can be used to support the customization of information for a number of regional websites that can be operated by the networked system 102 and that can be accessible via respective web servers 116.

Navigation of the networked system 102 can be facilitated by the navigation application 214. For example, a search application (as an example of a navigation application) can enable key word searches of listings published via the networked system 102. A browse application can allow users to browse various category, catalogue, or system inventory structures according to which listings can be classified within the networked system 102. Various other navigation application can also be provided to supplement the searching and browsing of the database 126 and/or various data hosted by the networked system 102.

In order to create listings that are visually informing and attractive, the application server 118 can include an imaging application 216 to allow users to upload images for inclusion within listings. An imaging application 216 also can operate to incorporate images within viewed listings. The imaging application 216 can also support one or more promotional features, such as image galleries that can be presented to potential buyers or bidders. For example, sellers or service providers can pay an additional fee to have an image included within a gallery of images for promoted services. In some implementations, the imaging application 216 also allows other users (e.g., users who have purchased a specific service of a user, or employed for the user for other service) to upload images of the service provider's work product on the service provider's listing page. For example, during the feedback phase where a buyer provides feedback to a seller who has rendered a specific service to the buyer, the buyer can upload images associated with the service offered by the seller onto the seller's listing page for subsequent use by the seller in future listing.

The listing creation application 218 can be used to allow sellers or service providers (or buyers and traders) to conveniently author listings pertaining to services that they wish to transact via the networked system 102, and listing management application 220 can be used to allow sellers or service providers (or buyers and traders) to manage such listings. Specifically, where a particular seller has authored and/or published a large number of listings, the management of such listings can present a challenge. The listing management application 220 can be used to provide a number of features (e.g., auto-relisting, inventory level monitors (e.g., how many of such services can be offered by the user), etc.) to assist the seller in managing such listings. One or more post-listing management application 222 also can be used to assist sellers or service providers with a number of activities that typically occur post-listing. For example, upon completion of an auction facilitated by the auction application 202, a seller can wish to leave feedback (e.g., via feedback page 595 shown in FIG. 5L) regarding a particular buyer or bidder, and vice versa. To this end, a post-listing management application 222 can be used to provide an interface to the reputation application 208 so that the seller can conveniently provide feedback regarding multiple buyers or bidders to the reputation application 208.

The dispute resolution application 224 can be used to provide mechanisms whereby disputes arising between transacting parties (e.g., between buyers and sellers, or between bidders and sellers, or between traders) can be resolved. For example, the dispute resolution application 224 can provide guided procedures whereby the parties can be guided through a number of steps in an attempt to settle a service-related dispute (e.g., the service rendered was not what was listed, the service was not professionally done as advertised, the service provider did not offer proper licensing information, the service was not done on the date or time specified in the listing). In the event that the dispute cannot be settled via the guided procedures, the dispute can be escalated to a third party mediator or arbitrator.

The fraud prevention application 226 can be used to implement fraud detection and prevention mechanisms to reduce the occurrence of fraud within the networked system 102.

The messaging application 228 can be responsible for the generation and delivery of messages to users of the networked system 102 where such messages can be used to advise users regarding the status of listings at the networked system 102 (e.g., providing "outbid" notices to bidders during an auction process or to provide promotional and merchandising information to users). In some implementations, the messaging application 228 also can be used to facilitate a step-by-step process where the buyers, sellers, service providers, bidders and traders can follow a pre-listed self-assisted process in completing a specific service transaction.

For example, where a user has initiated a trade request to trade a specific service with a seller (e.g., where the user offers plumbing services and the seller offers electrical services), the requesting user can initiate a trade request (to be discussed in greater detail below) in which the requesting user can follow a step-by-step process that is listed on the request to follow up on the request (to be discussed in more detail with reference to FIG. 5C below). As an example, the trade request can include a eight-step process such as, without limitation, "I send trade offer" (e.g., as a first step), "Trade Party accepts or declines my trade" (e.g., as a second step), "I confirm bid and all specified terms" (e.g., as a third step), "Trade party confirms all specific terms" (e.g., as a fourth step), "I and Trade Party provide services" (e.g., as a fifth step), "I and Trade Party exchange feedbacks" (e.g., as a sixth step), "Payment is released to me or Trade Party after receiving feedback/review" (e.g., as a seventh step), and "Transaction Complete" (e.g., as an eight and final step of the trade request).

In these implementations, as each step is completed, the messaging application 228 can update the trade request to allow both the user and the seller to track the current progress of the trade. As an example, where the seller has accepted the requesting user's request to swap services, the trade request can be updated (which can be viewed by either party) to show that the first step ("I send trade offer") and the second step ("Trade party accepts or declines my trade") have been completed (e.g., by highlighting those two steps in the request). By displaying a step-by-step process in which both trading parties can track the trade progress, the self-initiating service process can be enhanced and become more user friendly to all users interested in trading services.

In some implementations, as each step is completed (e.g., via a combination of user confirmation through the networked system 102), the publication application 200, the listing creation application 218, the listing management application 220, the post-listing application 222 and the messaging application 228, or a combination thereof, can update the trade request to reflect the most updated version of the trade request for tracking the most current progress.

The messaging application 228 can utilize any number of message delivery networks and platforms to deliver messages to users. For example, the messaging application 228 can deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks to each user from other users (e.g., buyers, sellers, bidders, traders and service providers).

The service application 230 can support various service-related functions that can be made available to sellers or service providers to enable sellers or service providers to increase service offering via the networked system 102. The service application 230 also can operate various service-related features that can be invoked by sellers or service providers, and can monitor and track the success of service-related strategies employed by sellers or service providers.

The networked system 102 itself, or one or more parties that transact via the networked system 102, can operate loyalty programs that can be supported by the loyalty/promotions application 232. For example, a buyer, seller, bidder, trader or service provider can earn loyalty or promotions points for each transaction established and/or concluded with a particular user, and be offered a reward (e.g., reward points) for which accumulated loyalty points can be redeemed.

In some implementations, each user also can earn points by offering his/her service in exchange for earning points from other users (e.g., points to be taken out of the buyer's account). In so doing, the user (e.g., the buyer) receiving the service can be charged by the amount equivalent to the service being offered (e.g., as specified by the user offering the free service). In some implementations, the buyer can purchase the service using either cash, points or a combination thereof. In return, the service provider offering the service can receive cash, points, or a combination thereof that is equivalent to (or greater or lesser than) the market price or price set by the service provider (e.g., via a formula set by the service provider to be discussed in greater detail below).

The inventory application 234 can assist sellers or service providers in managing inventory of services such as services made available within the application server 118. For example, inventory information regarding a specific service being offered can be uploaded to and managed by the inventory application 234. In some implementations, additional information regarding the services and/or inventory can made obtained through scraping, crawling and/or an API.

Conversion Formula Application

In some implementations, a conversion formula application 236 can be included and used to assist a user in setting a conversion formula by which a service can be valued (e.g., for converting values between commercial and proprietary currency). In some implementations, a user (e.g., a seller, service provider or trader) can define the cash value of the service to be rendered. In these implementations, the conversion formula application 236 can facilitate the determination of an appropriate conversion formula or ratio by which the cash value can be converted to other currency value. For example, where the user has defined a cash value of $60 per hour or per job for his/her plumbing service, the conversion formula application 236 can prompt the user to further define a conversion formula by which the cash value as defined can be converted to other currency value. As an example, the user can define a conversion formula of "$1=1.2 points", after which the conversion formula application 236 can compute that the service is also worth 72 points ($60×1.2 points) in value. Based on this point value, potential buyers can proceed to purchase the user's service by paying either the full $60, the full 72 points, or a combination thereof (e.g., $30 and 36 points)

In some implementations, the conversion formula application 236 also can receive a hybrid input where the user can define only a portion of the cash value for which points can be received. Using the example above, the user can define $40 of the $60 to be paid in cash, with the remaining $20 to be converted based on the conversion formula of "$1=1.2 points" or 24 points. In this example, the user can input $40 to the conversion formula application 236 while specifying the remaining to be paid in either more cash or points. As an example, potential buyers can submit $40 and 24 points (or the full $60) or $50 and 12 points to pay in full. Alternatively, the user can set a specific distribution that the user can only accept for the payment to be paid in full. For example, the user can specify that the potential buyer can only select either to pay the $60 in full, $40 and 24 points or $20 and 52 points and disallow any other type of combination of payment (e.g., the potential buyer cannot specify a payment of $30 with the remaining to be paid in points).

In some implementations, the user offering the service can define the maximum or minimum amount of a particular currency (e.g., either in cash or points) that a potential buyer can use in purchasing the user's service. For example, the user can set a ceiling or maximum value of 24 points as the maximum amount of points that a potential buyer can put forth in purchasing the user's service (e.g., with the remaining to be paid in cash or other currency). Where the potential buyer does not have sufficient points to meet the payment in full, the potential buyer can either purchase points from the networked system 102 (which can be discounted), or pay the remaining in cash. As an example, the store application 206 can be used to sell the potential buyer points (e.g., 1 point=$0.80 or 1.2 points=$0.96), which can be less than the conversion formula set by the user (e.g., $1=1.2 point).

At the time of creating a listing, the user can define a particular number of points and cash that he/she is willing to take in exchange for the service to be rendered by the user (whether it is a buy-now type listing or trade listing). In some implementations, during the listing creation, the user can define whether his service is tradeable or eligible for trade with other users. Where a service is tradeable, the listing can specify, in addition to information discussed above (e.g., the current highest bid, bid increment, quantity available, service description, images, professional license information, peer review or user feedback, professional ratings and the like), information such as the trade value/formula (e.g., "$1=1.2 points) and the method of trade (e.g., points, cash, other currency, or a combination thereof) (to be discussed in greater detail below with reference to FIG. 5D). In addition, the service listing also can specify information such as proof of insurance and/or bonding; the company name and name of the employee providing the service, legal status and operation history, and/or insurance company information that can be verified online in real or substantially real time, and the like. As discussed above, the trade value can specify a specific cash value, a point value, or a combination thereof as the service value for the service being offered.

When a potential trader selects the user's service that has been defined as tradeable, the listing can be populated that allows the potential trader to review the user's condition for the trade. The listing can specify, in addition to information discussed above (e.g., the current highest bid, bid increment, quantity available, service description, images, professional license information, peer review or user feedback, professional ratings and the like), information such as the trade value and the method of trade (e.g., points, cash, or a combination of both). The trade value can specify a specific cash value or points deemed to equate to the service being offered. For example, the user can list his/her plumbing services for a cash value of $60 per hour or per job. Where the user has selected an option during listing creation to receive all points instead of cash (e.g., in situations where the user wants to receive more interest to his service by including potentials buyers who can only afford to pay in points but not in cash), such information also can be indicated in the service listing for informing the potential buyers.

In some implementations, the user also can select a specific type of service that qualifies for trade. For example, in addition to the conversion formula, the user also can identify a list of services with which the user's service can be traded. As an example, a user offering plumbing services can specify golf lessons, culinary lessons, driving lessons, or piano lessons as services that are qualified for trade. In this example, a potential trader is limited to trade only one of the qualifying services before service trading between the user and the potential trader can occur.

In some implementations, where the user has multiple existing service listings (e.g., where the user is currently offering plumbing service, tutoring service, construction service and electrical service), the user can be prompted to select one of the active services to be traded. Similarly, where the potential trader has multiple existing service listings (e.g., where the potential trader is currently offering one of the qualifying services), the potential trader can be prompted to select one of the qualified services to be traded.

In some implementations, the user can select only services that are active for trade (e.g., where no trade can occur if the user has no active service listing for a particular service (e.g., because there is nothing to trade with)). Once an active, existing service listing indicating the service to be traded is selected, the user can either keep the value previously defined in the selected listing, modify the value, or set a new conversion formula upon which the service can be traded.

In some implementations, once a conversion formula has been set by the user, the potential trader is obligated to the conversion formula as specified, and cannot send new terms or proposed formula to the seller (i.e., no counter offer). Once the potential trader or buyer has agreed to make a bid or purchase the user's service, a notification is sent to the user for approval. If the user approves, the user can, in a reply message, specify a time and date that the user is to render his service (as listed in the service listing). The reply message can then be sent to the potential trader or buyer, and the potential trader or buyer can subsequently send a confirmation message to the user confirming the time and date. In some implementations, the potential trader or buyer can specify in the confirmation message whether the potential trader or buyer accepts the user's specified date and time. If the potential trader or buyer prefers a different date and time, the potential trader or buyer can specify a new time and/or date in the confirmation message to be sent to the user for further confirmation.

In some implementations, where the values of the services to be traded between the user and the potential trader have different allotted value, then the potential trader (e.g., at the time of trading) or the user (e.g., at the time of creating the service listing) can specify how the difference in value should be resolved. If the user or the potential trader is trading a more valuable service (e.g., service with a higher price value), then the user or the potential trader can be prompted to specify whether the other party is requested to compensate for the difference (e.g., by paying the difference in cash or in points), or whether the trade can proceed without further compensation (e.g., as if the values for both services are equivalent). Where the user or the potential trade has specified that no further compensation is to be paid for the difference in value, the user or the potential trader can be alerted (e.g., by displaying a warning message or displaying a warning on the service listing) that no compensation will occur prior to confirming the trade as a confirmation that the trade will be processed as if both services being traded are equally priced. Where the service offered to be traded (e.g., by the potential trader) is a less valuable service, the potential trader can be prompted with the conversion formula previously specified by the user identifying how the price difference should be resolved (e.g., specifying the number of points, cash, or both necessary to make the full payment).

In some implementations, a service listing can include a user option specifying whether the value or price for the service offered is negotiable. If the user has defined that the service to be offered is negotiable, a "Counter Offer" button can be displayed on the service listing that allows the potential trader or buyer to make new terms. Upon clicking on the "Counter Offer" button, a counteroffer page can be populated that allows potential trader or buyer to specify new terms (e.g., the potential trader or buyer can specify that he/she will pay $30 and 40 points instead of $40+20 points). Other changes such as date/time of the service to be received also can be specified at once in the counteroffer page.

In some implementations, a predetermined list of options also can be displayed on the counteroffer page. For example, a list of options that can be displayed on the counteroffer page can include, without limitation, "Does the service involve purchasing of materials?", "Will the buyer be charged for the purchase of materials?", "Time is of the essence, and the service must be rendered no later than the last day of the available week specified in the service listing", and the like.

Although the aforementioned implementations are described in relation to a sale or trade for service, these implementations also can be applied to applications where a buyer creates a listing in search of an appropriate service provider. For example, a buyer can create a service listing in search of celebrities to perform at the buyer's birthday party. In such a listing, the buyer can specify the price, the points or a combination thereof for such a service. As an example, the buyer can specify a price of $50,000 and 20,000 points in exchange for 4 hours of dancing or singing performance from an agreed-upon celebrity.

As discussed above, points can be used to bid on services. In some implementations, points can include, for example, any indication of value (e.g., monetary and/or non-monetary) which can be earned or obtained in any way. Points also can include restrictions, can be combined with other points, transferred from or to other accounts, be converted to other values, limited to certain geographic areas, earned in one or more programs and the like.

In some implementations, the conversion formula can be set by the network system 102 (e.g., auction application 202 and service application 230) as opposed to by the service provider.

In some implementations, the conversion ratio can be modified (e.g., whether by the network system 102 or individual service provider) over a certain time period, can change the ratio based on certain input from any participant, can change the ratio based on the type or level of participant (e.g., gold level member, frequent shopper/bidder, etc), can be subject to random changes, can be based on an algorithm, can be changed based on economic factors or other factors (e.g., consumer price index), can change based on the products or services offered for bid and the like. The time periods for changing the conversion ratio can include changes prior to, during or after a certain time interval (e.g., minute, hour, day, week, etc); prior to, during or after a certain time of day; prior to, during or after certain seasons (e.g., winter, spring, summer, fall); prior to, during or after certain events (e.g., Super Bowl); prior to, during or after certain holidays (e.g., Christmas) and the like. The changes based on input from other participants include, for example, conversion ratio changes based on the number of bids, the amount of a bid, the frequency of bids, the type or level of bidders, offers to submit non-point bids (e.g., barter, monetary amounts, etc), offers to submit non-point bids in addition to point bids, and the like.

Figure 3:
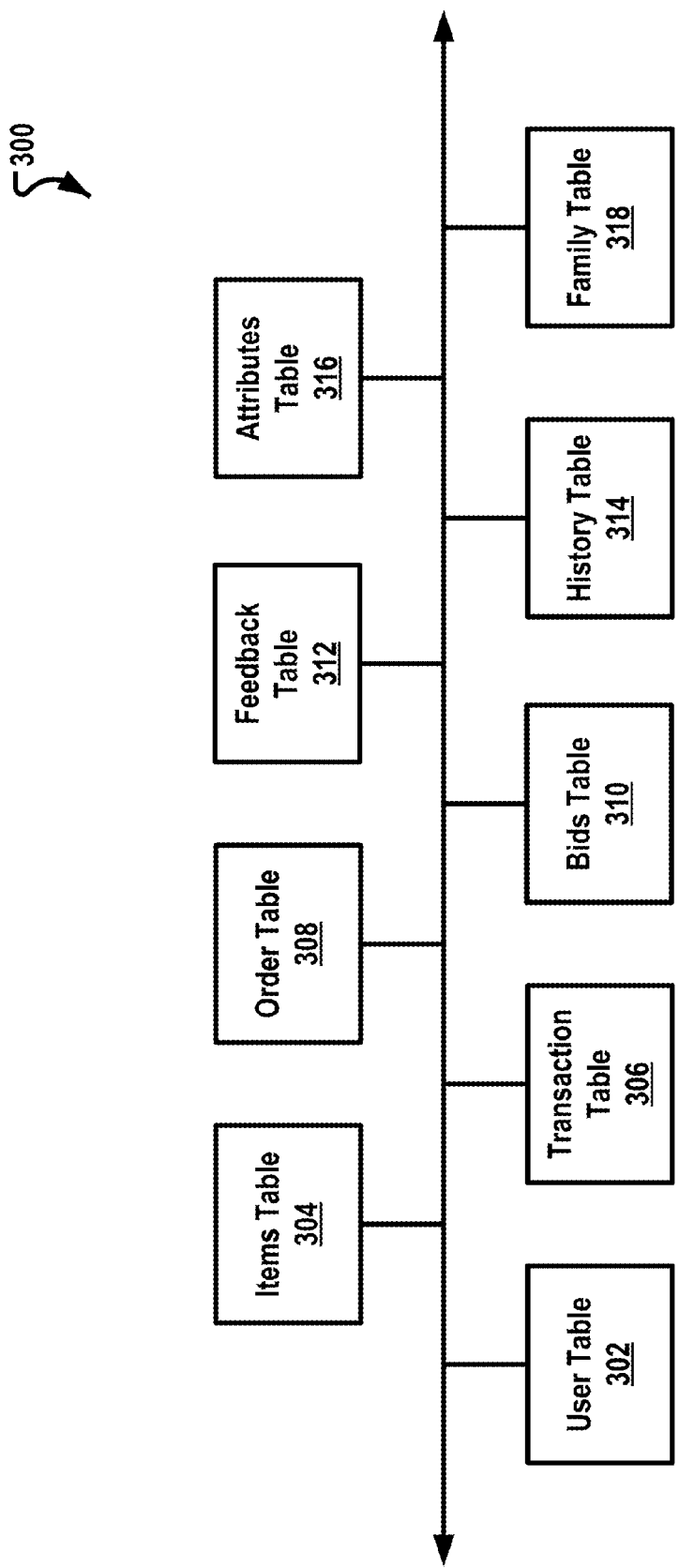
FIG. 3 shows various tables that can be maintained within a database for supporting the application server shown in FIG. 2.

FIG. 3 shows various tables 300 that can be maintained within the database 126 and utilized to support the application server 118. As shown, a user table 302 can contain a record for each registered user of the networked system 102, and can include identifier, address and financial instrument information pertaining to each of the registered users. A user can operate as a seller, a buyer, a bidder, a trader, a service provider, or a combination thereof within the networked system 102.

In some implementations, a buyer or bidder can be a user that has accumulated value (e.g., commercial or proprietary currency), and is accordingly able to exchange the accumulated value for services that are being offered for sale or trade by other users in the networked system 102.

The tables 300 also can include a services table 304 to maintain service records for services that have been transacted or to be rendered via the networked system 102. Each service record within the services table 304 also can be linked to one or more user records within the user table 302 so as to associate a seller or service provider and one or more actual or potential buyers or bidders with each service record.

A transaction table 306 can contain a record for each transaction (e.g., a purchase or sale transaction) pertaining to services for which records exist within the services table 304, while an order table 308 can display order records where each order record can be associated with an order for a service.

Bid records within a bids table 310 can each relate to a bid received at the networked system 102 in connection with an auction-format listing supported by an auction application 202. A feedback table 312 can be utilized by the reputation application 208 to construct and maintain reputation information concerning the users.

A history table 314 can be used to maintain a history of transactions to which a user has been a party. One or more attribute tables 316 can record attribute information pertaining to services for which records exist within the services table 304. Considering only a single example of such an attribute, the attribute tables 316 can indicate a currency attribute associated with a particular service, the currency attribute identifying the currency of a price for the relevant service as specified in by a seller.

Auction Overview

To access the networked system 102, a user can initiate a registration process. For example, the user can establish a connection with the networked system 102 and initiate the account setup process through the web client 106. The account setup process can include the networked system 102 determining if the user is a new user or a returning user (e.g., by the use of cookies (tokens), or authentication). For example, the user can be presented with a temporary account setup web page, which prompts the user to input information concerning the user's status as either a new or returning provider. The networked system 102 can define certain data that is required to be entered by the user during the registration process. For example, the networked system 102 can disallow the user from continuing with the registration process without receiving the name, address, email address, and the like. However, the networked system 102 can allow the registration process to continue if the user only desires to access as a guest user without, for example, service listing privilege.

If it is determined that the user is new to the networked system 102, the user can be presented with an account setup web page whereby the account setup process can be initiated. If the user chooses to initiate the account setup process, the user can be presented with a web page containing terms for participating in the networked system 102. Further, the user can be prompted to read the terms and provide input indicating whether or not the user accepts the terms. If the user's input indicates that the terms are not accepted, registration can be halted and the user can be again presented with an account setup web page. However, if the user's input indicates that the terms are accepted, then the user can be presented with a web page for which to enter information as discussed above. When the user completes and submits the requested information, the requested information can be stored in the database 126 where an account is then created associating the user with the account.

Upon accessing the networked system 102 and viewing a service listing, the user, who can be a potential buyer or bidder, can enter the information necessary to place a bid, such as bid amount, payment information, and the like, and subsequently, press a bid submission button, or take a similar action to send the bid to the networked system 102.

The networked system 102 can receive the electronic bid information and place the bid in the database 126 (e.g., which can include one or more auction databases, service description databases, bid databases and user-related databases). Because this new bid will, in general, be a bid for a higher amount than the last bid submitted by another party, the networked system 102 will update the service listing with the latest bid. This updated service listing will then display the new, highest bid to any prospective bidders who later access that service listing.

In some implementations, the networked system 102 can send electronic mail notifications (e.g., via messaging application 228) to bidders who have been outbid by the just-placed bid. These electronic mail notification messages can contain the relevant service information, the current high bid, the bid increment, and encourage the bidder to submit a new and higher bid to outbid the current high bidder. These electronic mail notification messages can allow the bidder to enter a new bid by replying to the electronic mail message and sending it back to the networked system 102.

Upon receiving a new or revised bid via electronic mail (or via actual bidding through the service listing), the networked system 102 can follow the same set of actions as when the bidder places a bid using the electronic bid form when viewing a service listing. Specifically, the networked system 102 can extract the relevant bid information from the electronic mail message, deposit this information into the database 126, and then update the service listing as appropriate. Such an electronic mail message bid can further cause a new round of electronic mail notifications to go out to the recently outbid bidders.

This process can continue until the networked system 102 detects that the service listing is scheduled to be closed for further bidding or another closing trigger is detected. At this point, the networked system 102 can close the auction by updating the service listing with the final winning bid information and by sending electronic mail notifications to both the winning bidder or bidders and the losing bidder or bidders.

Prior to placing a bid, potential buyers or bidders can be presented with a series of descriptive service listings through which they can navigate to find services (lots) of interest. Upon finding a lot of interest, potential buyers or bidders can be prompted to place a bid on the lot. After submitting the bid, the networked system 102 can record the bid and update the lot's service listing to show the current high bid or bids and to whom such bids can be attributable. When the auction is closed, after a period of no bidding activity, at a predetermined time, or when a desired sales volume is reached, the networked system 102 can notify the winning and losing bidders by electronic mail and post a list of the winning bidders on the closed lot's service listing.

Potential buyers or bidders can be presented with an interface (e.g., interface 502 shown in FIG. 5A) with a service listing offering plumbing service (e.g., generated listing management application 220). Each service listing can include one or more formula conversion selects that allow the potential buyers or bidders to specify the form of bid and/or payment. For example, a bidder can select to bid in cash, in points or a combination thereof.

Once a bid is placed, bid information can be received by the networked system 102 where the bid information is processed by the networked system 102 to validate the bid information. For example, the auction application 202 and/or service application 230 can examine the bid information entered by a bidder on the service listing to ensure that the bid is properly formatted, all necessary data is present, the data values entered look credible, and the like. The auction application 202 and/or service application 230 can also perform functions where a service is being purchased (instead of being auctioned off). For example, the auction application 202 and/or service application 230 can perform the verification of credit card information entered by the buyer, checking that a complete name and address at which the service is to be rendered have been entered, that the proper state abbreviation and zip code have been entered, that the payment has been paid in full, and that a telephone or facsimile number has been entered.

As an example, when a bid is received by the auction application 202 and/or service application 230, the bidder submitting the bid can be looked up in database 126. If no user record exists for the bidder, then a new user record can be created and placed in the database 126. Then, the bid information can be validated as previously described. If the bid data includes one or more errors, then an error message is returned to the bidder, for example in the form of a well-formatted page posted across the network, identifying the errors found in the bid. If the bid is valid, then the bid can be recorded in the database 126.

Once the bid information has been validated, the bid can be placed in the database 126 (e.g., via auction application 202).

In some implementations, the networked system 102 can utilize the service application 230, auction application 202 and/or the navigation application 214 to query the database 126 to determine if any new bids have been placed. If new bids can be found during the query, then the auction manager can determine the current high bidder or bidders, which then updates the service listing with the updated bid information.

In some implementations, the service application 230, auction application 202 and/or the navigation application 214 can perform opening and closing auctions, which can include making service lots available for bidding by potential buyers and bidders, and disabling their associated buy or bid features on the service listing that have been posted to potential bidders but have closed. When the service application 230, the auction application 202 and/or the navigation application 214 can determine that a new lot should be opened for bidding or an available lot should be closed, the service application 230, auction application 202 and/or the navigation application 214 can instruct the listing management application 220 and/or service application 230 to create or update the service listing for the appropriate lots.

Bid Status Notification

In some implementations, the messaging application 228 can query the database 126 for bids recently marked by the service application 230, auction application 202 and/or the navigation application 214 as having been outbid or as having won a service in a recently closed auction. If such bids can be found, the messaging application 228 can format an appropriate electronic mail notification message, and send the message to the bidders so as to keeper the bidder them informed about the status of the service listing on which they are actively bidding. Bidders can reply to an electronic mail notification message informing them that they have been outbid by including an increased bid amount in a reply message. An electronic mail bid sent in reply to the notification can be received by the networked system 102 and processed by the auction application 202 as described above.

As discussed above, the messaging application 228 can notify bidders when they have been outbid. Specifically, the messaging application 228 can detect the presence of these marked bids, look up an outbid bidder's electronic mail address and look up inventory information on the service desired by the bidder. With this information, the messaging application 228 can create an electronic mail message informing the bidder that he or she has been outbid. Once created, an electronic mail notification message can be sent to the bidder.

Various components of the network system 102 can communicate between themselves in a variety of ways. In general, various applications 200-236 can communicate by adding, marking, and updating records in the database 126. Each of these applications 200-236 can periodically check the database 126 to determine if anything relevant to their respective functions has changed and take action accordingly. The applications 200-236 can also send direct messages therebetween or call each other by means of program subroutines to signal important events that would require one or the other applications 200-236 to update its state or status.

A variety of different auction formats can be implemented using the basic technique described above. The simplest is the "Standard Auction" format, whereby the network system 102 can award an offered service to the top bidder or bidders in accordance with the bid or bids once the auction has expired. Using this format, if there is a specific service that can be offered more than once (e.g., where a plumber can offer his plumbing services in a four-week period), the network system 102 can first award the service to the top bidder, and losing bidders can continue to bid on the remaining "service unit", and different successful bidders can, in general, pay different prices for the same service being offered.

Auction Scheduling

In some implementations, the auction application 202 and the service application 230 can be a continuously running application that begins by retrieving the current time, and determine if any new services for sale (or trade) are to be posted by examining the database 126. Examining the database 126 allows the auction application 202 and the service application to determine whether there are new service listings scheduled to be made available for bidding at (or before) the current time. If so, the auction application 202 and the service application can immediately activate the service listings for immediately bidding.

The auction application 202 and the service application 230 also can examine the database 126 to determine if any service listings are scheduled to be closed from bidding. If so, these services can be closed from bidding 53.

In some implementations, a seller or service provider can adjust the price of the service offered in a service listing. Where there is a price adjustment pending, the auction application 202 and the service application 230 can examine the database 126 to determine if any services posted with a price markdown feature can be scheduled to have the price of a respective service adjusted. In some implementations, the prices of these services can be adjusted in accordance with the particular service's price adjustment parameters. Such parameters can include, without limitation, bidding activity over time, amount of bids received, and number of services bid for.

Updating Bids

As discussed above, once a new bid is submitted, the auction application 202 and the service application 230 can update the current bid. Where there are multiple bids pending, the auction application 202 can sort all of the submitted bids using a variety of different priority ranking schemes. Then, each bid can be marked as either successful or unsuccessful depending upon the bid price of the respective bid and the quantity of the service being bid on relative to the quantity of the service being auctioned. In some implementations, a quantity of an service can be put up for auction, and individual bidders can bid on any quantity of the service desired, up to the quantity of the service being auctioned (e.g., where a bidder has bid for three plumbing services from the seller or service provider).

In some implementations, the auction application 202 can check whether there are any active proxy bids marked as unsuccessful. A proxy bid is a special bid type that allows the auction application 202 to automatically bid on the bidder's behalf up to a limited amount established by the bidder when his or her initial bid is placed. The auction application 202 can increase the bid as necessary up to the limit amount. This feature allows a bidder to get the lowest possible price without exceeding a limit preferably established when the bid is entered. If there are active proxy bids marked as unsuccessful, then the auction application 202 can increment the proxy bids by a preset bid increment. This procedure of sorting and marking bids, and incrementing proxy bids as required can continue until either there can be no additional proxy bids marked as unsuccessful or the proxy limits have been reached on the proxy bids. At this point, the database 126 can be updated with the marked bids. This process is then repeated for each lot open at the current time for bidding.

During operation, the auction application 202 can determine which bids to mark as successful or unsuccessful. The auction application 202 can begin by sorting the bids based on the amount of the bid. If there are bids remaining to be processed, the highest remaining bid can be selected to be checked. If the bid is below the minimum bid allowed for the particular service, the bid can be marked as unsuccessful. If not, the bid can be checked to see if the quantity can be satisfied. A bid can be satisfied if the quantity of the service bid upon is available. This information is available from the database 126. If not, then the bid can be marked as unsuccessful. Optionally, the user can be queried if a lesser quantity than bid upon is acceptable. If the bid quantity can be satisfied, then the bid is marked as successful and the service quantity remaining, recorded in auction database, is decremented by the bid quantity. After the quantity remaining is decremented, and if there are still bids remaining to be marked, the next highest bid is selected and the foregoing process can be repeated until all bids have been examined.

As discussed above, the auction application 202 can determine which bids to mark as successful or unsuccessful. The auction application 202 can sort the bids based on the amount of the bids. If there are bids remaining to be processed, the highest bid can be selected to be checked. If the bid is below the current price of the service, then the bid is marked unsuccessful. If the bid is not below the current price, then the bid can be checked to see if the bid quantity can be satisfied. If not, the bid is marked as unsuccessful. If the bid quantity can be satisfied, then the bid can be converted into an order at the current price of the service and the service's quantity remaining is decremented. The bids remaining to be processed can be then checked and foregoing process can be repeated. From time to time, the current price of the service can be raised or lowered either by manual input from the seller (e.g., under certain conditions to avoid fraud) or by automatically using the "markdown" feature discussed previously.

Dutch Auction Format

In some implementations, the networked system 102 can provides a "Dutch Auction" format, wherein the networked system 102 awards a service to all of the top bidders for whom there is available inventory at the price bid by the lowest successful bidder. This format can be preferred by bidders for being the most fair when a plurality of a specific service is being auctioned. As with all bidding, there will be a range of bids submitted. In the Dutch Auction format, the highest bidders can be awarded the service but at the same price for all successful bidders, the price bid by the lowest successful bidder.

For Dutch Auction format, the auction application 202 can determine which bids to mark as successful or unsuccessful. The auction application 202 can sort the bids based on the amount of the bids. If there are bids remaining to be processed, the highest bid can be selected to be checked. If the bid is below the minimum bid allowed for the particular service, the bid can be marked as unsuccessful. If not, the bid can be checked to see if the bid quantity can be satisfied. If the bid cannot be satisfied, then the bid can be marked as unsuccessful. If the bid quantity can be satisfied, then the bid can be marked as successful and the service quantity remaining can be decremented by the bid quantity.

At this time, the MinWin price can be recorded. The MinWin price is the price above which a new bidder must bid in order to be successful in the Dutch Auction format were the auction to close at that moment. The MinWin price is, in general, the bid price of the lowest bid that is marked as successful. After recording the MinWin price, where there are still bids remaining to be marked, the next highest bid can be selected and the foregoing process can be repeated until all bids have been processed.

Progressive Auction Format

The networked system 102 can also include a "Progressive Auction" format, wherein the networked system 102 can award the service to the top bidders based on price bid. As with the Dutch Auction format, the highest price bids can be awarded the service up to the quantity available of the service being auctioned. However, unlike the Dutch Auction format, the networked system 102 can award the service to the successful bidders at different prices depending on the quantity bid.

In some implementations, a successful bidder for a single unit of an service can be awarded the service at the price of the lowest successful bid for a single unit of the service. A successful bidder for a higher quantity of the same service can be awarded the service at the price of the lowest successful bid at that quantity or any lower quantity. For example, a successful bidder for a quantity of five would pay the lowest price for any successful bid for quantity one through five of the service. The price paid for a given quantity is termed the "MinWin" price for that quantity. The Progressive Auction format ensures that successful bidders for a quantity of an service pay the lowest price paid by any other successful bidder at that quantity level or below. Use of this format can lead to lower prices for those who successfully bid on larger quantities of an service, provides an impetus for volume buying, and therefore leads to greater sales volume.

Similar to Dutch Auction format, in Progressive Auction format, the auction application 202 can determine which bids to mark as successful or unsuccessful. The auction application 202 can sort the bids based on the amount of the bids. If there are bids remaining to be processed, the highest bid can be selected to be checked. If the bid is below the minimum bid allowed for the particular service, the bid can be marked as unsuccessful. If not, the bid can be checked to see if the bid quantity can be satisfied. If the bid cannot be satisfied, then the bid can be marked as unsuccessful. If the bid quantity can be satisfied, then the bid can be marked as successful and the service quantity remaining can be decremented by the bid quantity. The MinWin price can then recorded. After recording the MinWin price, if there are still bids remaining to be marked, the next highest bid can be selected and the foregoing process can be repeated until all bids have been processed.

Buy or Bid Format

The networked system 102 can also include a "Buy Or Bid" format wherein the networked system 102 can award services to bidders who place bids at or above a posted selling price. The service remains for sale until the available quantity is purchased. Bids that are below the posted selling price can be maintained in reserve by the networked system 102. If a certain sales volume is not achieved in a specified period of time, the networked system 102 can automatically reduce the price by a predetermined amount or a predetermined percentage of the price and update the service listing accordingly. The lower price can be at or below some of the bids already in the bid database. If such bids can be present, they can be then converted to orders and the quantity available can be reduced accordingly. Similarly, if a certain sales volume is exceeded in a specified period of time, the networked system 102 can automatically increase the price by a set amount or by a set percentage of the price and updates the merchandise page accordingly. These automatic price changes allow the seller to respond quickly to market conditions while keeping the price of the service as high as possible to benefit the sellers or service providers.

Bid Quantity

As discussed previously, if a bid quantity is determined to be more than the available quantity of the service available, then the bid can be checked to see if the bidder is willing to accept a reduced quantity. When placing a bid, the bidder can indicate its willingness to accept a partial quantity in the event that an insufficient quantity of the service is available to satisfy the bid if successful. If the bidder is found willing to accept a reduced quantity, then the bid can be marked as a successful bid. If not, the bid can be marked as unsuccessful.

Price Markdown

As discussed above, the networked system 102 also can includes a "markdown" feature, wherein the auction application 202 can award a service to buyers or bidders who place orders at the currently posted selling price. The service remains on sale until the available quantity is purchased. If a certain sales volume is not achieved in a specified period of time, the auction application 202 can automatically reduce the price by a set amount or a set percentage and updates the service listing accordingly. This lower price encourages buyers or bidders to take advantage of the new price. If a certain sales volume is exceeded in a specified period of time, the auction application 202 can automatically increase the price by a set amount or a set percentage and update the service listing accordingly. These automatic price changes allow the sellers and service providers to respond to market conditions while keeping the prices of the merchandise as high as possible to the benefit of the sellers and service providers.

In operation, the auction application 202 can periodically adjust the sales prices or minimum bid prices of the services according to a predetermined schedule. If more services can be found in the database 126, a service listing can be selected for markdown. If a markdown event has occurred for the service, the service's price can be adjusted according to the schedule preset for the individual service. Alternatively, the adjustment can be relative to prices offered for the service. The service listing can then be updated in the database 126 with the new sale price or minimum bid price.

Proxy Bidding

As discussed above, the networked system 102 can include a "Proxy Bidding" feature that can be applied to any of the auction formats. When Proxy Bidding is employed, a bidder can place a bid for the maximum amount the bidder is willing to pay. The auction application 202, however, only displays the amount necessary to win the service up to the amount of the currently high proxy bids of other bidders. Typically, the currently high bids display an amount that is one bidding increment above the second highest bid or bids, although a percentage above the second highest bids can be used as well.

When a new bidder places a bid that is above a currently displayed high bid, the proxy feature will, in general, cause the currently high bid to move up to an amount higher than the new bid, up to the maximum amount of the currently high bidder's proxy bid. Once a new bidder places a bid in excess of the currently high bidder's proxy bid, the new bid becomes the current high bid and the previous high bid becomes the second highest bid. This feature allows bidders to participate in the electronic auction without revealing to the other bidders the extent to which they are willing to increase their bids, while maintaining control of their maximum bid without closely monitoring the bidding process. Participation is engaged automatically on the bidder's behalf by the auction application 202. This feature guarantees proxy bidders the lowest possible price up to a specified maximum without requiring frequent inquiries as to the state of the bidding.

A variety of different auction formats can be implemented in addition to those described above. The networked system 102 can, for example, also employ a "Floating Closing Time" feature whereby the auction for a particular service is automatically closed if no new bids can be received within a predetermined time interval. This feature would typically be implemented in a manner similar to that used to close auctions of old services. This feature forces the bidding activity to occur within a shorter amount of time than would otherwise be achieved because bidders are aware that the service will automatically close if no new bids have been received in a timely manner. Thus, bidders have an incentive to stay active in the bidding process to avoid closure of a service before maximum, and most potentially winning, bids have been entered. The Floating Closing Time feature also allows more services to be auctioned during a period of time since each service is closed once bidding activity ceases; the bidding period is not protracted to an artificial length as is the case when an service closes at a preset date and time. The Floating Closing Time feature also can be employed either in conjunction with or independent of a fixed closing time for an service. When employed in conjunction with a fixed closing time, the auction is closed either when the preset fixed time period has expired for the service or when no bidding activity has occurred within a preset time interval. This forces the bidding to cease at a particular time in case the bidding activity becomes artificially protracted.

Reverse Auction

In some implementations, bidding and selling can be reversed. For example, as discussed previously, a buyer can post a service listing in search of qualified sellers or service providers who meet the buyer's requirement such as the years of experience, the type of talent, and professional licenses. Such a buyer can include, for example, a corporation wishing to better advertise their products, a business in need of a better designed Web page, a private individual looking for interior designers for architectural advice. In such a listing, bidders can include potential service providers rather than those wishing to receive a service such that the bidders are seeking to bid on the right to render a requested service.

By way of example, a bidder can be a movie house with advertising space to sell, a newspaper with advertising space to sell, an Internet portal with space to sell, a graphic designer, an attorney, computer programmer, and the like.

A buyer can create a service listing to purchase a specific service with specific terms (e.g., to an acceptable price). Hence the reverse auctioning can be taken place by receiving bids from service providers and sellers who are bidding as low and favorable price as possible for the buyer in accordance with their respective profit margins in relation to the purchase price. The favorable bidding can, for instance, include other offers such as future discounts and/or gifts.

Additional Implementations

A service listing, regardless of the auction format used, can include a service description of a service offered or requested. In some implementations, service templates can be provided by the service application 230 for creating the service listing. Optionally, the service listing templates can be customized based on a specific type of service being requested, such as "gardening service" or "landscaping service". Depending on the service category, description can include, but is not limited to, an overall description of the service, with or in the form of any text, picture, drawing, audio video, or any other material that can be used to describe the service and that can be encoded and communicated electronically using computers or other electronic communication devices.

A service description can also include information such as an address and/or zip code of the service location, a start and stop time and/or date for the service; the form or of payment that the buyer or seller will accept; optional times when the buyer or seller may be available to assist in completing the service; an automatic municipality and/or building code or zoning reference, such as a hyperlink or a system for accessing a database, based on the address and/or zip code of the property; a distance calculation of the service provider to the service site; exterior pictures and route access to the service site; and an option to access additional information. Optionally, the buyer or seller can upload as much service description as desired. The buyer or seller also can upload a base amount of data, such as two megabytes, for free or for a base fee, with additional data requiring an additional charge.

Bidder Qualification

In some implementations, a buyer or seller can limit who can bid on the service listing through specific qualifications. In some implementations, the buyer or seller may request criminal and/or credit background or service history checks on potential buyers, bidders and sellers, and the buyer or seller can limit bidders to only those with a certain level of credit worthiness and/or a clean criminal background. Optionally, the number of bidders on a service can be limited if requested by the user posting the service listing.

To implement criminal background checks, the auction application 202 may interface with external, third-party systems to perform background or credit history verification. In some implementations, users can have a background or credit history verification performed as part of the registration process or even at a later time after registration. Users with a completed background and/or credit history check can be displayed by the networked system under the users' profiles as well as in the service listings hosted by the registered user with the completed background or credit history check. The display can employ a display scheme whereby different alerts are used such as a red alert, a green alert and a yellow alert. A red alert can indicate that a user does not have a clean background and/or credit history and was involved in more than one offense. A yellow flag can indicate that the user does not have a clean background and/or credit history but has not been involved in any major offenses. And finally, a green flag indicates that the user has a clean background and/or credit history.

Credit checks also can ensure that the user has good credit history and can make prompt payments. Credit checks can be used as a criterion or qualification by the service providers in restricting services that users can bid on. Credit checks can be especially useful for services involving extensive labor, where the amount of fees are generally much higher than other smaller services. The fact that a user possesses good credit can put the service providers at ease and help the service providers in identifying eligible bids. In some implementations, credit checks can be available to both bidders and service providers, and both parties can use credit checks for negotiation.

Conditional and Binding Bids

When a bid is submitted, the submitted bit can be conditional or binding. A conditional bid may be a bid that is conditioned on receipt of additional information from the buyer or seller, and/or on the buyer's or seller's agreement to one or more conditions submitted by the submitting party. A bindings bid may be one that the submitting party considers to be final. A conditional bid can be considered inactive and remain so until it is either abandoned or turned into a binding bid by the submitting party. After receiving additional information in response to a conditional bid or request for information, the submitting party can be permitted to change (increase or decrease) the bid amount or withdraw the bid. Optionally, the conditional bid can be cancelled by the networked system 102 if the submitting party does not convert it to a binding bid within a predetermined time period.

A conditional bid can be used where the bidder does not fully understand the service description but has interest in bidding on the service being offered or requested. A conditional bid can be submitted with a clarification request on the service description. In some implementations, a conditional bid can be considered inactive and remain so until it is either explicitly abandoned (e.g., cancelled) or turned into a binding bid by either the bidder or the user posting the service listing with the consent of the bidder.

In some implementations, a conditional bid is not binding and not considered while determining the winning bid for auctions. Optionally, conditional bids can be given a time period within which the conditional bids will either expire or be turned into binding bids if not acted upon within the time period. Optionally, the bidder can be permitted to change the value of a submitted conditional bid upon receiving more information or other circumstances from the user. Optionally, a bid can include both time and materials, or the networked system 102 can require the bidder (or user posting the service listing) to provide separate bids for separate elements of the service, such as service stages, time and/or materials.

Negotiation and Private Listing

Upon receiving a conditional bid, the user posting the service listing can optionally provide extra information as requested by the bidder. In some implementations, information exchange between the participating parties can be viewed as a negotiation stage in which either the bidder or the user can negotiate new terms before the conditional bid is converted into a binding one. Once the user has provided the requested information or terms negotiated, the bidder can change the conditional bid into a blinding bid, or may abandon it by canceling the bid altogether. In some implementations, the newly negotiated terms also can be reflected in the service listing.

In some implementations, the service listing updated with the negotiated terms can be closed to all bidders (e.g., by cancelling all existing bids) except the bidder with whom the new terms are negotiated (e.g., since other bidders might not confer to the newly negotiated terms agreed upon by other individual bidders). In so doing, the user can be given flexibility to tailor a service specific to the needs of an individual bidder. Alternatively, the existing service listing can remain active, while a new service listing specifying the newly negotiated terms can be created that the bidder with whom the new terms are negotiated can accept and purchase. Similarly, a service provider can submit an information request with a conditional bid (e.g., in reverse auction) that can be converted into a binding bid if the service provider is satisfied with the extra information and still has an interest in the job. Once an auction expires, all conditional bids can be invalidated.

In some implementations, a user can create a private listing in which the user can send out one or more invitations to one or more individuals to view the private listing and to submit one or more bids. As an example, a user can send an invitation containing the identification number associated with the private listing using the messaging application 228. Upon receiving the invitation, an invited bidder can search the service inventory (e.g., via inventory application) to locate the private listing using the associated identification number.

The private listing, in some implementations, can be closed to the general public, and can only receive bids from qualifying individuals that have previously been invited by the user or individuals previously specified by the user during the creation of the private listing. Such bidders can be selected based on the user's personal knowledge, or based on information contained in a service provider database. If bidders are invited, the auction application 202 can alert the invited bidders about the private listing. In some implementations, even if the user does not select bidders to invite, the auction application 202 can optionally invite, on behalf of the user, all bidders who meet certain qualifications such as geography, technical skills, years of experience or other information.

By allowing bidders to request and exchange information with the service providers, an interactive process can be provided between the parties as pan of the online auctioning. As a result, if a vital piece of information is missing from the service listing, the bidders can request the missing information from the service providers before making any bids.

After a bidder submits a bid, in some implementations, the bidder can be permitted to modify or retract the bid. Optionally, retraction or bid increase can be prohibited in a predetermined time period before the end of auction (e.g., two hours before closing). Optionally, retraction of a bid can result in a bid cancellation charge.

After potential buyers or service providers (in reverse auction) has submitted bids on a service, the user posting the service listing can be permitted to view and compare the bids. The user can perform criminal and/or other background checks on a bidder before deciding whether to accept a bid from the bidder. In some implementations, selection criteria can be established to ensure that only qualified bidders are permitted to bid on a service. Examples of selection criteria can include, without limitation, consumer satisfaction ratings, credit ratings, background checks, credit worthiness, distance from service location, years of experience, formal education, other services taken and/or completed as recorded by the networked system 102, and the like. Such criteria can be predetermined or user selectable. In such an implementation, the networked system 102 will only allow bidders meeting the criteria to bid on the service being auctioned. Also optionally, the user can be permitted to invite specific bidders to participate in an auction.

In some implementations, a potential bidder can request more service related information from the user, thus providing an interactive exchange of service-related information. For example, the potential bidder can require more detail about the service requested or offered, such as duration, location or job scope, in order to provide a bid. The potential bidder also can submit a conditional bid, in which the potential bidder submits a price and certain conditions or variations not expressly listed in the service description of the service listing.

In some implementations, the user may broadcast a "service announcement" via the networked system 102 to prospective bidders before bidding starts where prospective bidders can seek clarification of service-related information. Optionally, a potential or actual bidder can visit the jobsite to better understand the service being requested. If no interest is shown during the announcement period, the networked system 102 can prompt the user to modify the service listing to achieve more interest from bidders. The messages can be stored and presented as part of the service listing. Also, the job announcement process can require all parties to confirm understanding of all criteria set forth in the service listing before bidding on the service can commence.

In some implementations, identities of bidders and/or the amounts of bids can be hidden from the general public. Additionally, in some implementations, before a service listing starts or after the service listing closes, a contracting process can be initiated whereby each party agrees to be bind by the binding bid. This may be done through a click-through or electronic signature process to ensure that the completion of the auction results in a binding legal agreement.

In some implementations, bidding may continue over a predetermined time period selected by the user (e.g., 24 hours, 48 hours, or another time period). Also, bidding can be permitted to continue until a predetermined maximum number of bids is reached. Also, optionally, no bids can be accepted unless the bids are above a predetermined minimum price. Such a bid price can be listed in the service listing. If no one bids for a service within the predetermined time period, the user can be offered an opportunity to modify the service listing and re-list the same service for no additional charge or for a fixed fee.

In some implementations, the user in creating the service listing can establish a "service now" price or "auction close" price as part of the listing creation whereby any bid with this price is instantly declared the winning bid and the auction immediately closes. Where two or more bids of the same value are placed and the user does not select one of the bidders, the auction application 202 can automatically select the first bid placed as the winning bid. Also optionally, if a bidder withdraws a bid, once submitted, the bidder may be penalized by the auction application 202 or given negative rating and feedback. In some implementations, "service now" (or "Buy-now") or "auction close" price can be implemented in conjunction with predefined user qualification criteria where only those qualified buyers are allowed to purchase a service using the "service-now" price.

Escrow Application

In some implementations, the application servers 118 can include an escrow application 238 whereby the buyer, seller, bidder, trader or service providers can request an escrow service to hold the payment for the service. The escrow application 238 can require submission of actual funds from the bidder, or it may simply hold the bidder's credit card number and charge the bidder when payments are due (e.g., where a deposit is required or at the completion of the service). The on-escrow application 238 can include an interface where the bidder can establish and/or negotiate milestones for the service, payment and completion. When both parties are in agreement that a service has been completed (e.g., via feedback to be completed after rendering service) or a service milestone has been achieved, the escrow application 238 can release all or partial funds to the service provider. Alternatively, the milestones and payment terms can be part of the bid. Participating parties also can be provided the opportunity to purchase liability insurance via the escrow application 238 for the service being offered (or requested).

In some implementations, after the auctioned service has been rendered, the networked system 102 can enable the service provider and/or the buyer to confirm the final payment for the service rendered. After the service has been rendered, in some implementations the buyer also can be requested to provide feedback on and rate the service. The networked system 102 can keep track of all feedbacks and ratings that can be posted onto the buyer and the service provider's user profile that can be accessed by the general public.

In some implementations, the winning bidder and/or service provider can receive a post-auction report. The post-auction report for the service provider can include information such as auction identification; congratulatory message; winning bid amount; winning bidder, optional contact information for the winning bidder; related auction service charges; link to a provider feedback form; a consumer satisfaction feedback form; an auction closure tracking form; tax-related forms; forms and/or links for purchasing insurance; forms and/or links for setting up an escrow with a milestone-based escrow payment released. Similarly, the post-auction report for the winning bidder can include similar types of information. Also optionally, once the job is completed, both participating parties can be required to confirm some or all of the information on the report.

One common problem with online auctions is bid-sniping. In bid-sniping, a predatory bidder waits until just before the auction expires to make a favorable bid. This leaves the user posting the service listing possibly accepting a bid that is not necessarily the most advantageous to him/her. If the user notices bid-sniping activity, then the user could cancel the auction and face an auction cancellation charge. These are not fair choices to the auctioneer. Bid-sniping can eventually erode the trust in the networked system 102.

Another common problem with online auctions is bid-gaming. In bid-gaming, a bidder may actually submit a high-bid just to see how the competition reacts. This makes other bidders hesitant in participating in the auctioning process. Bid-gaming can actually lead to a higher price than one that could have been obtained via traditional methods such as direct quotes or sealed-bids.

To protect against bid-sniping and bid-gaining problems, in some implementations, the networked system 102 can provide a blind-auctioning with feedback mechanism. Blind-auctioning can be used to hide bid amounts from all bidders. During the auction, the bidders will only be allowed to see their own bids and whether or not theirs is the winning bid (lowest bid). Blind-auctioning thus ensures the privacy of each bidder's bid. A bidder can comfortably bid on a service being offered or requested without revealing their bid to other interested bidders. A bidder with a losing bid will then be motivated to modify the bid and submit a new bid. This will, in turn, help bidders get a lowest/highest possible price for the service being offered/requested and also help ensure that the service provider does not under bid the service due to competitive pressure.

Expedited Listing

From time to time, buyers may have an emergency or rush service that needs to be done quickly or immediately, or a request to post an expedited listing. For such services, there might not be enough time to go through a complete auctioning process, which may take more than a day to complete.

Thus, in some implementations, the auction application 202 can provide an emergency service auction that is limited in time. Once an emergency service is posted, all service providers with matching qualification will be informed via the messaging application 228. In some implementations, each service provider will be allowed to make one and only one bid.

An emergency auction may close upon the occurrence of a predetermined event, such as when one of the following occurs, including, without limitation, auction time expires (e.g., where the bidder with the lowest bid is selected as the auction winner), buyer intervention (e.g., where the buyer manually selects a winner any time) and the like.

Once an auction closes, the service provider can perform the service auctioned off. The service provider can receive the highest bid amount as the payment after performing the job. In some implementations, the payment can be released only after the bidder has submitted a positive feedback to the networked system 102 specifying that the service has been rendered satisfactorily. Alternatively, a partial payment can be released as a deposit (e.g., where purchase of materials is needed) with the remaining payment being transferred to the service provider's account after the bidder has submitted a positive feedback. In some implementations, a bidding service fee can be deducted before payment is released to the service provider.

There can be times where the service provider finds discrepancies between the service listing and the serviced actually requested by the winning bidder. Similarly, the bidder might not have received the service as advertised on the service listing. In those cases, the service provider and the winning bidder can resolve the differences in an offline manner. Alternatively, both parties can undergo a dispute resolution process (e.g., provided by the dispute resolution application 224) in which the networked system 102 can act as a mediator to resolve the dispute between the parties.

Feedback

As discussed above, after a service has been rendered, the winning bidder can provide feedback on the service received (e.g., prior to releasing payment to the service provider). In some implementations, the reputation application 208 can employ a feedback algorithm to calculate a feedback score based on feedback given by the bidder including variables such as, without limitation, provider quality, provider time adherence, provider politeness, provider reliability, listing accuracy, and the like. Also, in some implementations, feedback received from bidders or other users with a history of disputes, problems & negative feedback can be highlighted and/or scored with different weighting factors in determining a feedback score to be assigned to a service provider (or buyer).

For example, the reputation application 208 can take a weighted mean value from the person leaving the feedback (example, people with good feedback are not affected but people with multiple negative feedback leaving feedback will not have the same weighting factor). Only a partial amount of the feedback score can be taken into the feedback calculation in such cases. This option will prevent a good consumer or service provider's reputation from being adversely impacted by the misuse of the feedback system.

In some embodiments, the reputation application 208 also can include tools to allow the contractor/service provider or the auction winner (bidder) to correct the bad or low feedback left by negotiating on the remedies and performing those remedial actions before a positive feedback can be issued. In some implementations, such a negotiation can be specified during the dispute resolution process provided by the dispute resolution application 224. Once the remedial actions have been performed (e.g., as manually confirmed by the bidder initiating the dispute), the dispute resolution application 224 and the reputation application 208 can modify the negative feedback based on confirmation from one or more parties and remove the previous negative feedback.

In some implementations, the reputation application 208 also can employ a multivariable feedback mechanism to evaluate both service providers and bidders/buyers based on multiple variables and compute a score based on the feedback left for each variables. Each variable can have a weighting factor. For example, there may be three unique variables that feedback will be left for both the service provider and the buyer. The service provider and the buyer can each give a score, such as a score of 1 to 10 (1 being poor and 10 being excellent), for each of the variables based on the experience with the respective party in the service.

For the service provider to the buyer feedback, the variables can include, without limitation, payment promptness, personality of the buyer and expectation. For the buyer to the service provider feedback, the variables can include, without limitation, accuracy of the service listing, quality of the service rendered, reliability and timeliness of the service. Each of these variables can be individually multiplied by a corresponding weighting factor and summed. The sum total can then be divided by the sum of the weighting factors used for the variables to arrive at a score of 1 to 10 for a specific service.

The foregoing process can apply to both the service provider and the buyer. As the service provider and the buyer accumulate multiple services, the score from all the services can be added and divided by the number of service offered or received to give an average score. If there is a dispute between the feedback left between the service provider and the buyer, both parties can send a confirmation though the feedback confirmation page and correct the feedback, thus resulting in a new feedback score and eliminating the old record.

Exemplary Processes

Figure 4A:
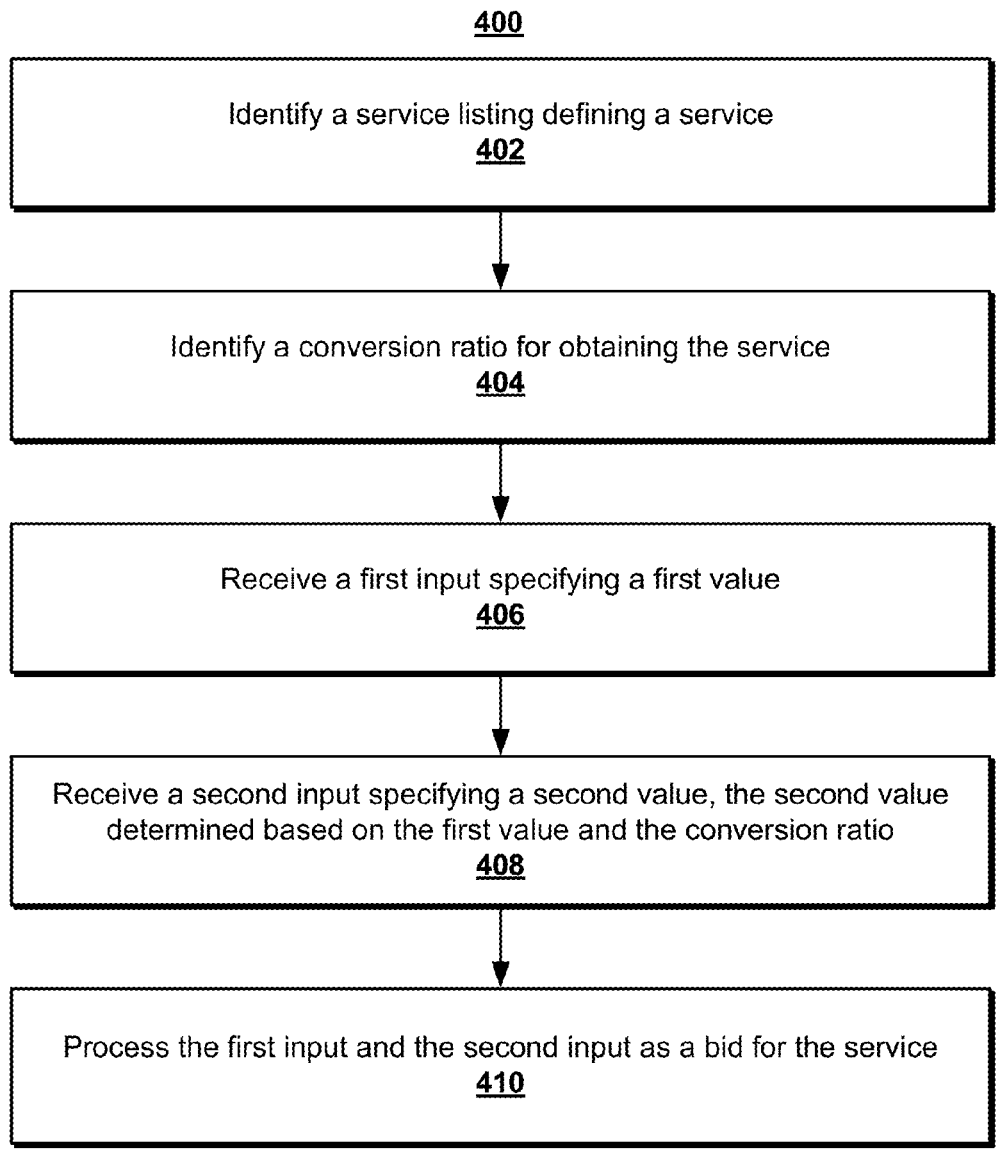
FIG. 4A shows an example of a process for processing a bid based on a conversion formula.

FIG. 4A shows an example of a process 400 for processing a bid based on a conversion formula. The process 400 can be performed, for example, by the networked system 102, and for clarity of presentation, the description that follows uses the networked system 102 as the basis of examples for describing the process 400. However, another system or combination of devices, applications and systems also can be used to perform the process 400.

At 402, a service listing defining a service can be identified. At 404, a conversion ratio for obtaining the service can be identified. At 406, a first input specifying a first value can be received. At 408, a second input specifying a second value can be received. In some implementations, the second value can be determined based on the first value and the conversion ratio. At 404, the first input and the second input can be processed as a bid for the service.

Figure 4B:
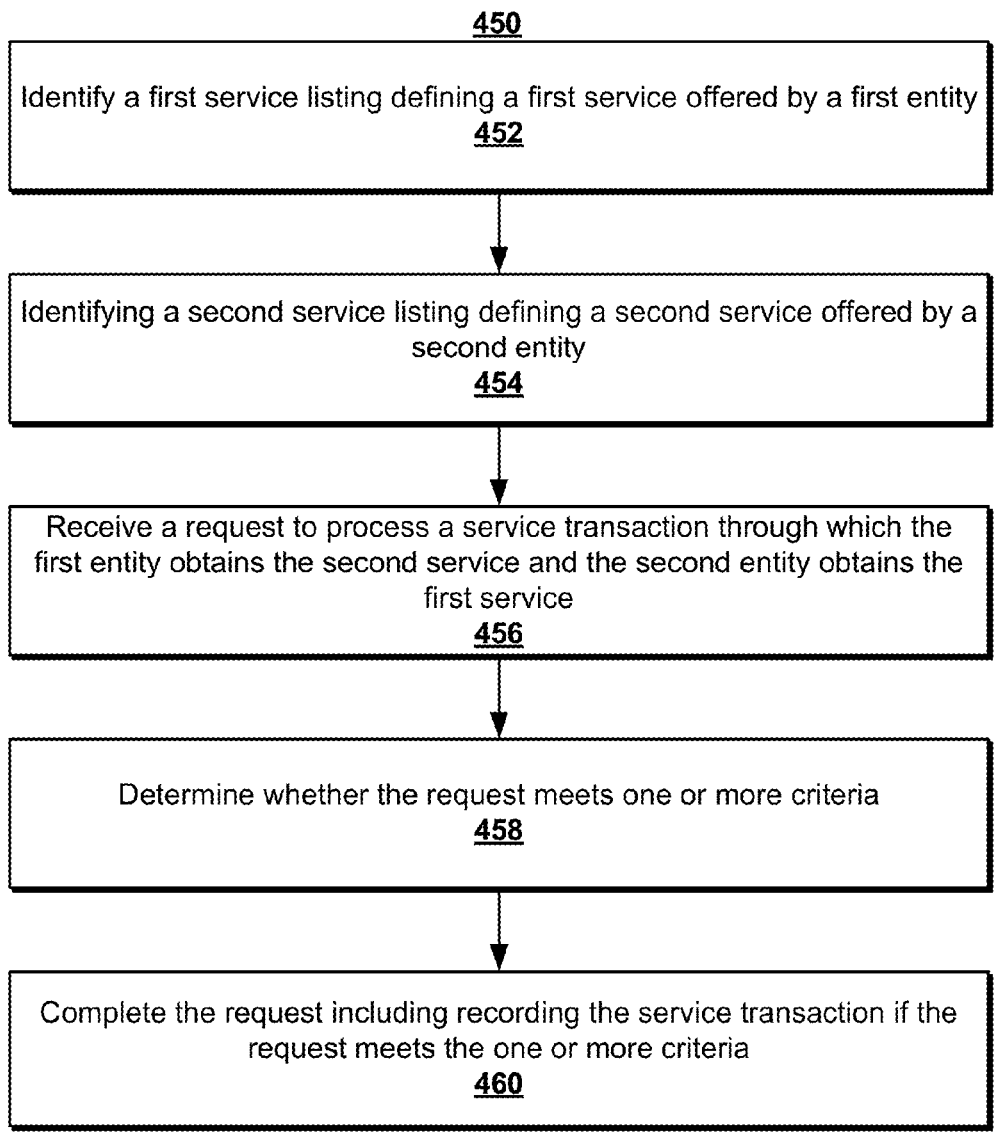
FIG. 4B shows an example of a process for completing a service transaction in which a first entity and a second entity can receive a second service provided by the second entity and a first service provided by the first entity, respectively.

FIG. 4B shows an example of a process 450 for completing a service transaction in which a first entity and a second entity can receive a second service provided by the second entity and a first service provided by the first entity, respectively. The process 450 can be performed, for example, by the networked system 102, and for clarity of presentation, the description that follows uses the networked system 102 as the basis of examples for describing the process 400. However, another system or combination of devices, applications and systems also can be used to perform the process 450.

At 452, a first service listing defining a first service offered by a first entity can be identified. At 454, a second service listing defining a second service offered by a second entity can be identified. At 456, a request to process a service transaction through which the first entity obtains the second service and the second entity obtains the first service can be received. At 458, whether the request meets one or more criteria can be determined. At 460, the request can be completed. In some implementations, the service transaction can be recorded if the request meets the one or more criteria.

Exemplary Screenshots

Figure 5A:
FIG. 5A is an exemplary screenshot of a bid page.

FIG. 5A is an exemplary screenshot of a bid page 500 (which also can be used as a service listing). As shown, the bid page 500 can include an area 502 in which a bidder can specify the method of payment. For example, the bidder can select one of three options: "Your max cash bid", "Your max TradeGig points bid", and "Your max combination bid". The "Your max cash bid" option allows the bidder to specify the amount in cash as payment to be submitted as the bidder's bid. The "Your max TradeGig points bid" option allows the bidder to specify the number of points that the bidder owns to be used as the bidder's bid. The "Your max combination bid" option allows the bidder to enter a combination of cash and points as payment to be submitted as the bidder's bid. In some implementations, where points are used for bidding, the number of points required can depend on the conversion formula 504 specified on the bid page 500. For example, where the service provider has defined "$1=3.5 TRADEGIG points" as the conversion formula, the bidder can enter a specific amount of cash in the area 502, with the remaining to be paid in points that are calculated based on the specified conversion formula. As an example, where the bidder desires to submit a total net bid of $400, the bidder can specify $300 in cash as payment, with the remaining $100 to be converted into points based on the specified conversion formula. In the example shown, the bidder can enter 350 points ($100×3.5 points) to be submitted along with the previously specified $300 in cash as the bidder's bid.

Figure 5B:
FIG. 5B is an exemplary screenshot of a first portion of a trade page.

FIG. 5B is an exemplary screenshot of a first portion of a trade page 510. As shown in FIG. 5B, a trader can create a trade listing in which the trader can specify the conditions for service trading. As an example, the trader can specify a service category and/or service sub-category with which the trader's service can be traded. For example, the trader can specify "Sports" in the service category field and "Basketball lessons" in the service subcategory field to specify that the trader only desires to trade with users or service providers who are providing basketball lessons in exchange for the trader's service. The trader also can specify whether the trader is willing to accept a payment in cash, points or combination thereof for the price difference where the trader's service is higher in value than the service being received in return.

Figure 5C:
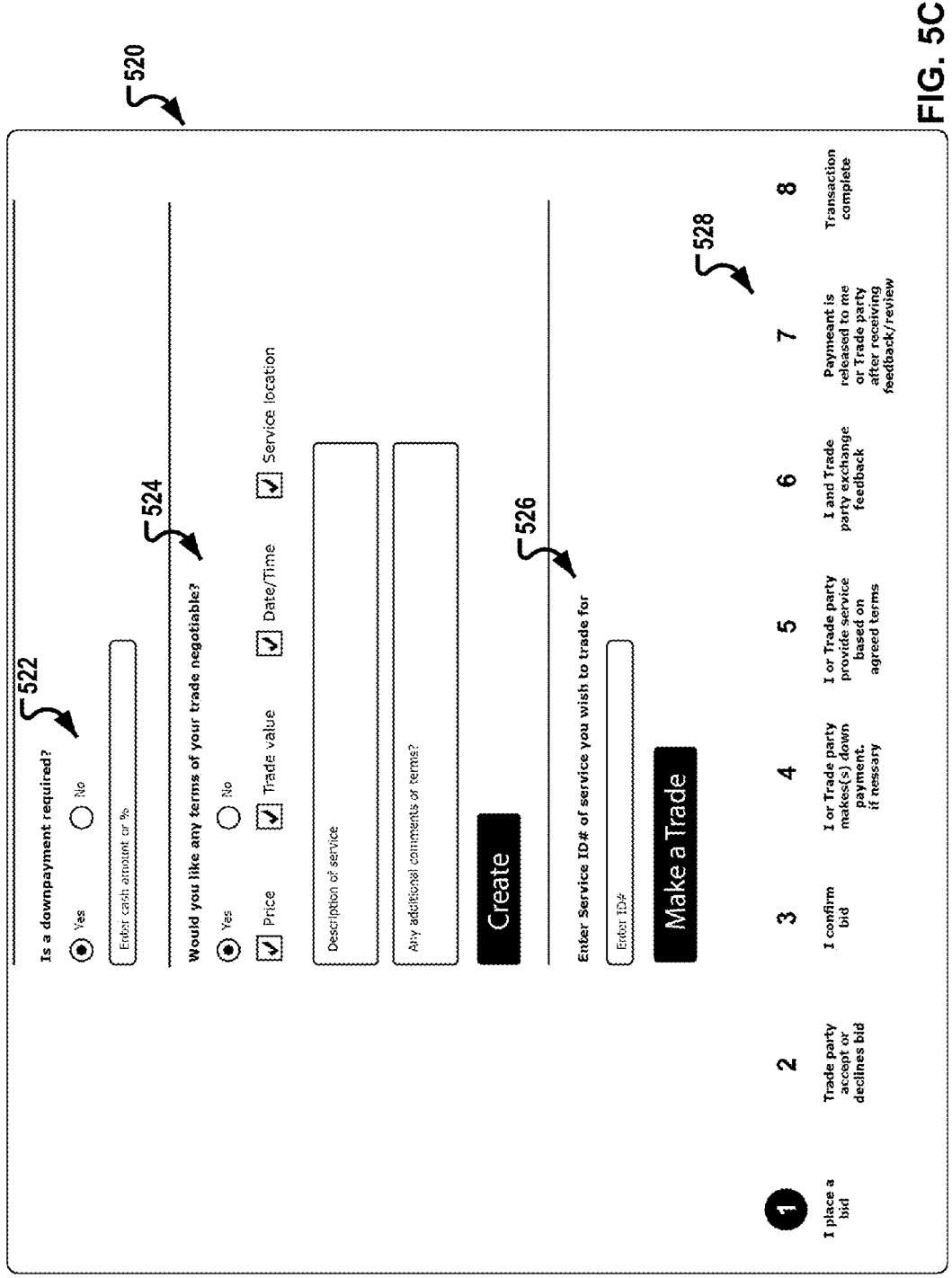
FIG. 5C is an exemplary screenshot of a second portion of the trade page shown in FIG. 5B.

FIG. 5C is an exemplary screenshot of a second portion of the trade page 520 shown in FIG. 5B. As shown, the second portion 520 can include a field 522 in which the trader can specify whether a down payment is required (e.g., where the trader's service is higher in value than the service being received in return). The trader also can specify whether any terms associated with the service offered for trade is negotiable. For example, the trader can specify that the price is negotiable. In this example, specifying that the price is negotiable allows the trader to negotiate with other potential traders in arriving at a price difference that can be negotiated. For example, the trader can specify that the trader is willing to pay $20 for qualifying services that are priced $40 higher than the service being offered for trade by the trader (e.g., where the trader's service is priced at $60 and the potential trader's service is priced at $100, and where the trader only has to pay $20 to complete the trade). Similarly, the trader can specify that the trader is willing to accept $10 as the price difference for qualifying services that are priced $20 lower than the service being offered for trade by the trader (e.g., where the potential trader only has to pay $10 to the trader to complete the trade).

Generally, each bid page or service listing is assigned a unique service listing identification number (e.g., identification number 506 shown in FIG. 5A). In some implementations, the trader can specify the identification number of the service listing offering the desired service for trade. As an example, where the trader desires to trade with a golf professional offering one golf lesson as specified in a service listing assigned with an ID number "00123456789", the trader can simply input the ID number "00123456789" in the ID field 526, after which the trade request can be submitted to the networked system 102 and sent to the golf professional.

The second portion 520 also can indicate a step-by-step process indicator 528 that displays the current status of a proposed trade. In the example shown, the process indicator 528 can visually indicate that the current status is "I place a bid", meaning that the trader has submitted or is about to submit a proposed trade. The process indicator 528 also can include other status indicators, such as "Trade Party accepts or declines bid" (e.g., as a second step), "I confirm bid" (e.g., as a third step), "I or Trade party make(s) down payment if necessary" (e.g., as a fourth step), "I and Trade Party provide service based on agreed terms" (e.g., as a fifth step), "I and Trade Party exchange feedback" (e.g., as a sixth step), "Payment is released to me or Trade Party after receiving feedback/review" (e.g., as a seventh step), and "Transaction Complete" (e.g., as an eight and final step of the trade request). The process indicator 528 allows the trader and the other trader to quickly identify the status of the trade, and whether further actions must be taken in order to complete the trade.

Figure 5D:
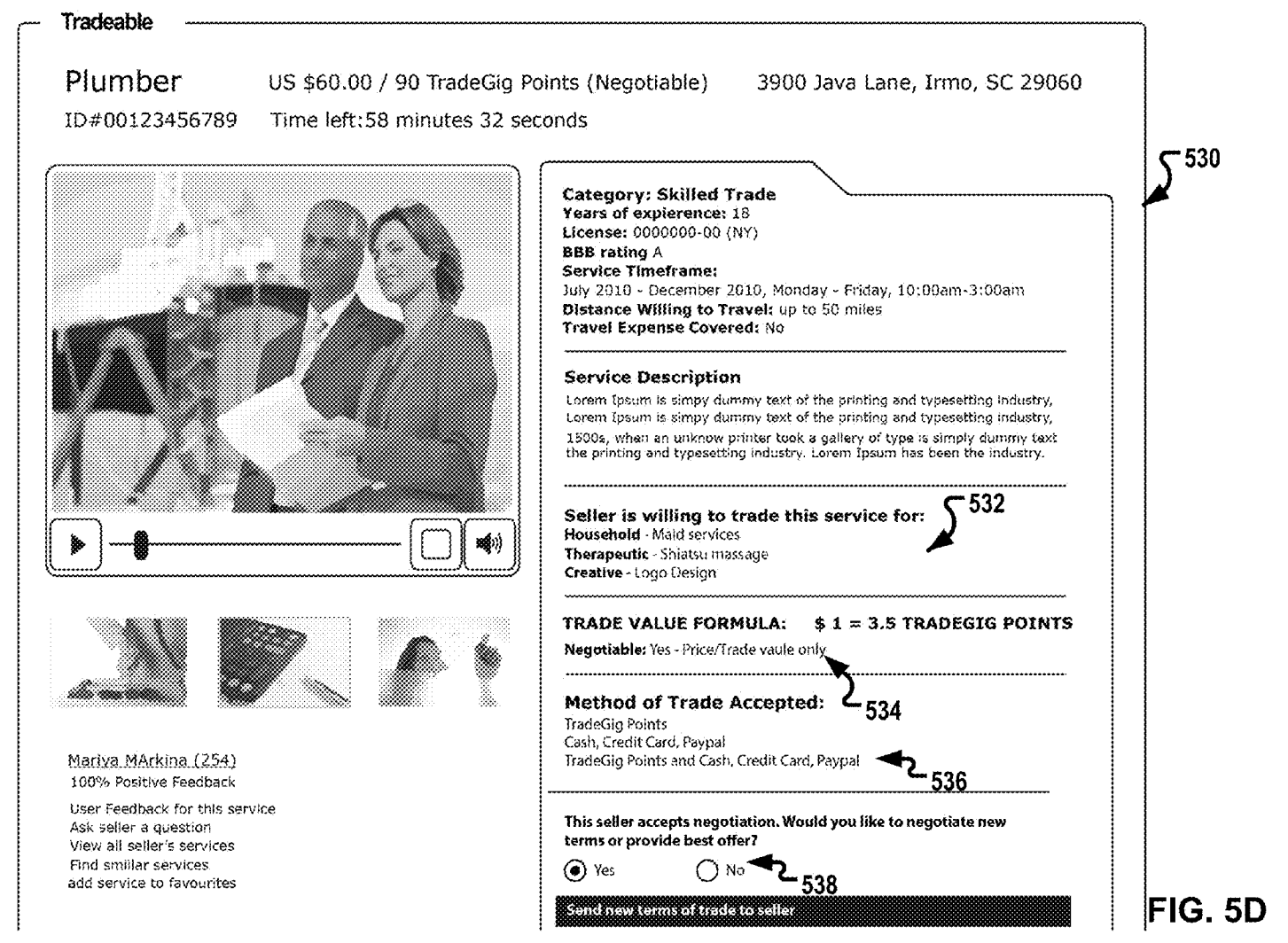

FIG. 5D is an exemplary screenshot of a first portion of a tradeable page 530. In some implementations, where a service provider has specified a service listed in a service listing as "tradeable", the service listing can display such a status to potential buyers and bidders. The "tradeable" service listing can display services that are qualified for trade in the qualifying service section 532. In the example shown, the service provider accepts trade offers from other service providers who are offering either "maid services" as subcategory and "Household" as category; "shiatsu massage" as subcategory and "Therapeutic" as category; and "logo design" as subcategory and "Creative" as category.

The "tradeable" service listing also can specify the type of method of trade accepted by the service provider as indicated in the "Method of Trade Accepted" section 536. In the example shown, the service provider accepts points, cash, credit, or a combination thereof for trade (e.g., which can be used where the service to be received as trade is lower in price than the service being offered by the service provider).

The "tradeable" service listing also can specify whether the service provider accepts negotiation as indicated in the "Negotiable" field 534. In the example shown, the service provider accepts negotiable terms (e.g., to be negotiated between the service provider and the interested buyer or bidder). For example, the interested buyer or bidder can submit new terms such as new negotiable price to the service provider for consideration by first selecting the "Yes" button in field 538. Once it has been specified that the potential trader would like to negotiate with the service trader based on new proposed terms, the potential trader can select which active service (e.g., where the potential trader has multiple active service listings) that the potential trader would like to trade, as shown in FIG. 5E. FIG. 5E is an exemplary screenshot of a second portion 540 of the tradeable page 530 shown in FIG. 5D.

Referring to FIG. 5E, the potential trader also can specify, in section 542, whether the proposed service to be offered for trade with the service provider is worth more, less, or the same as the service being offered by the service provider. Where the potential trader's service is wroth more than the service offered by the service provider, the potential trader can specify whether the price difference is to be paid in cash, points, or a combination thereof. The potential trader also can specify a minimum amount of cash value that must be paid to the potential trader where the remaining difference can be paid in any currency (e.g., in cash or points). In some implementations, the potential trader also can specify different or additional terms in the comment box 544 to be submitted as a proposed bid to the service provider to complete the trade.

FIG. 5F is an exemplary screenshot of a dispute resolution page 550. As shown, the dispute resolution page 550 can provide one or more dispute resolution channels through which an issue with a buyer, bidder or service provider can be identified and resolved. For example, a user can report, through the dispute resolution page, feedback abuse, feedback extortion, unwelcome bidding or buying, buyer protection issue, feedback manipulation, unpaid service, fraud and other issues to the networked system 102.

Figure 5G:
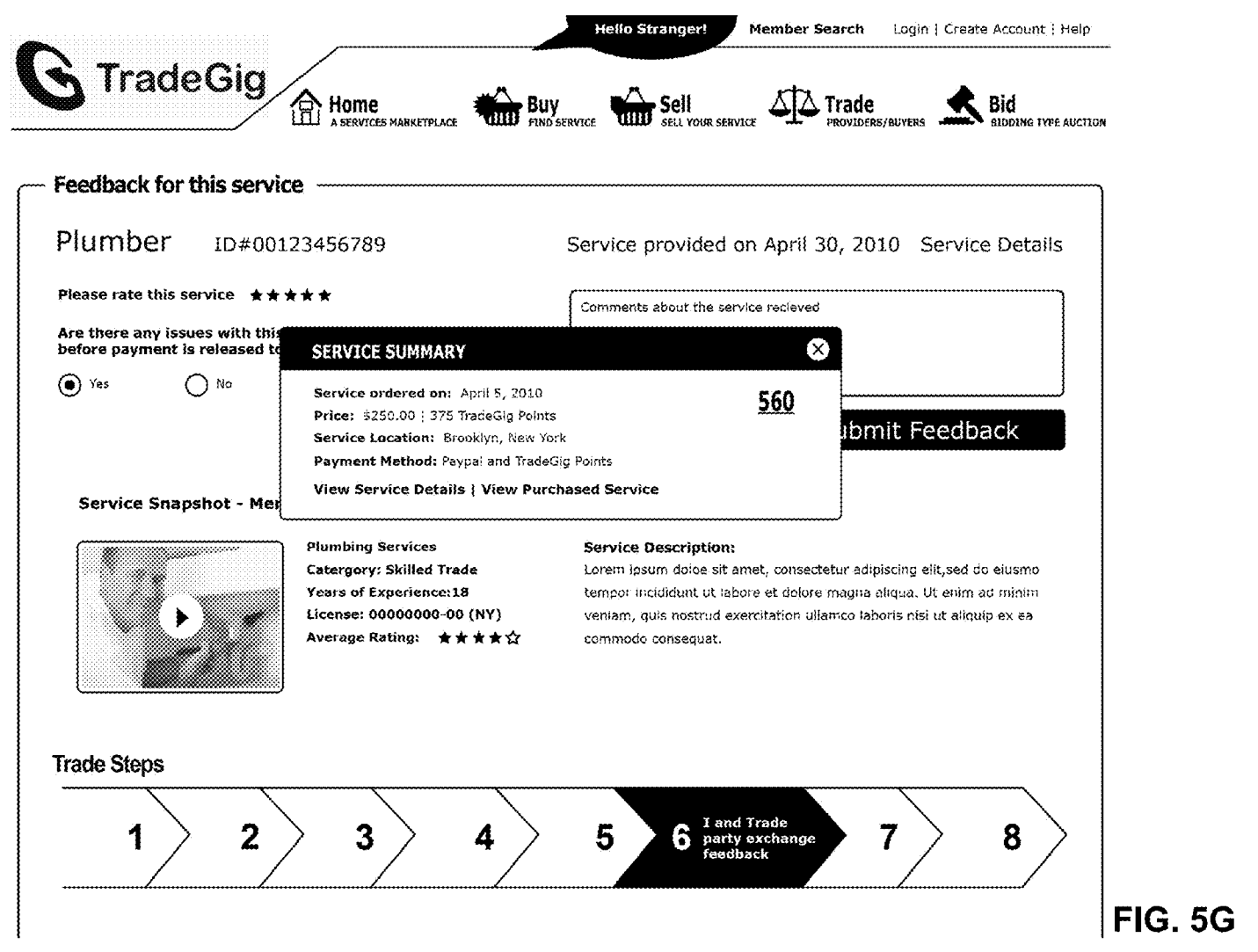
Figure 5H:
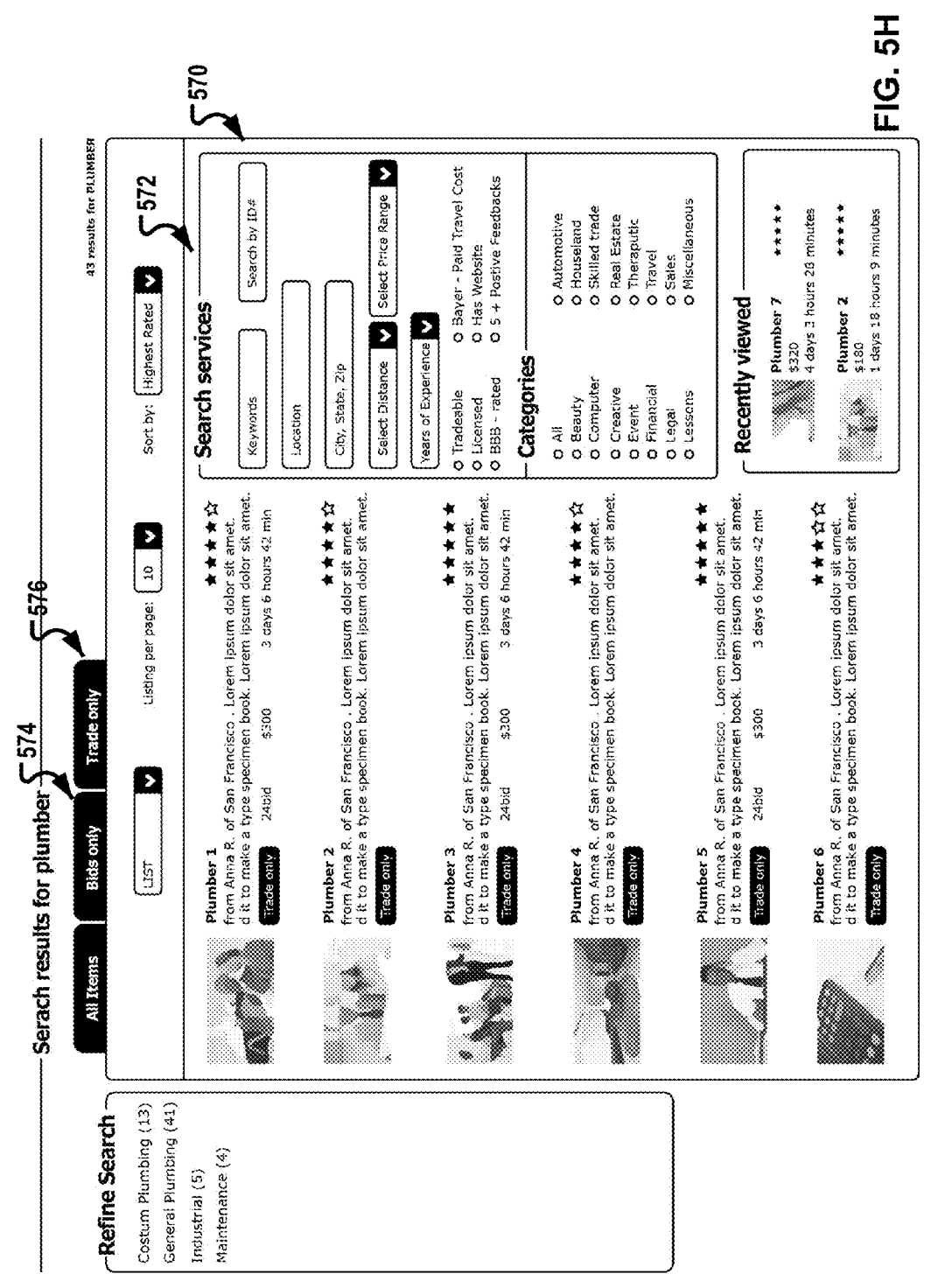
Figure 5I:
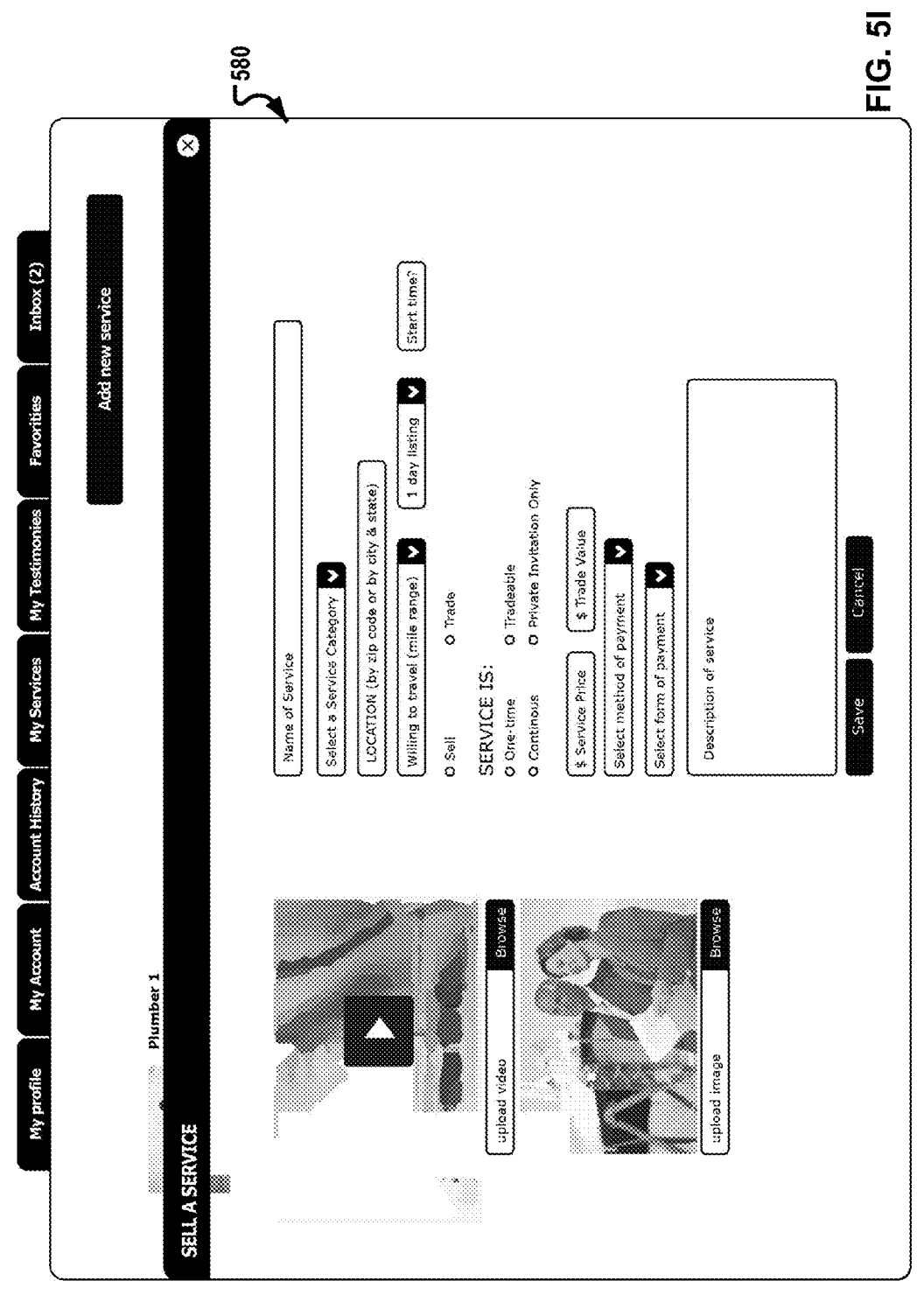
Figure 5J:
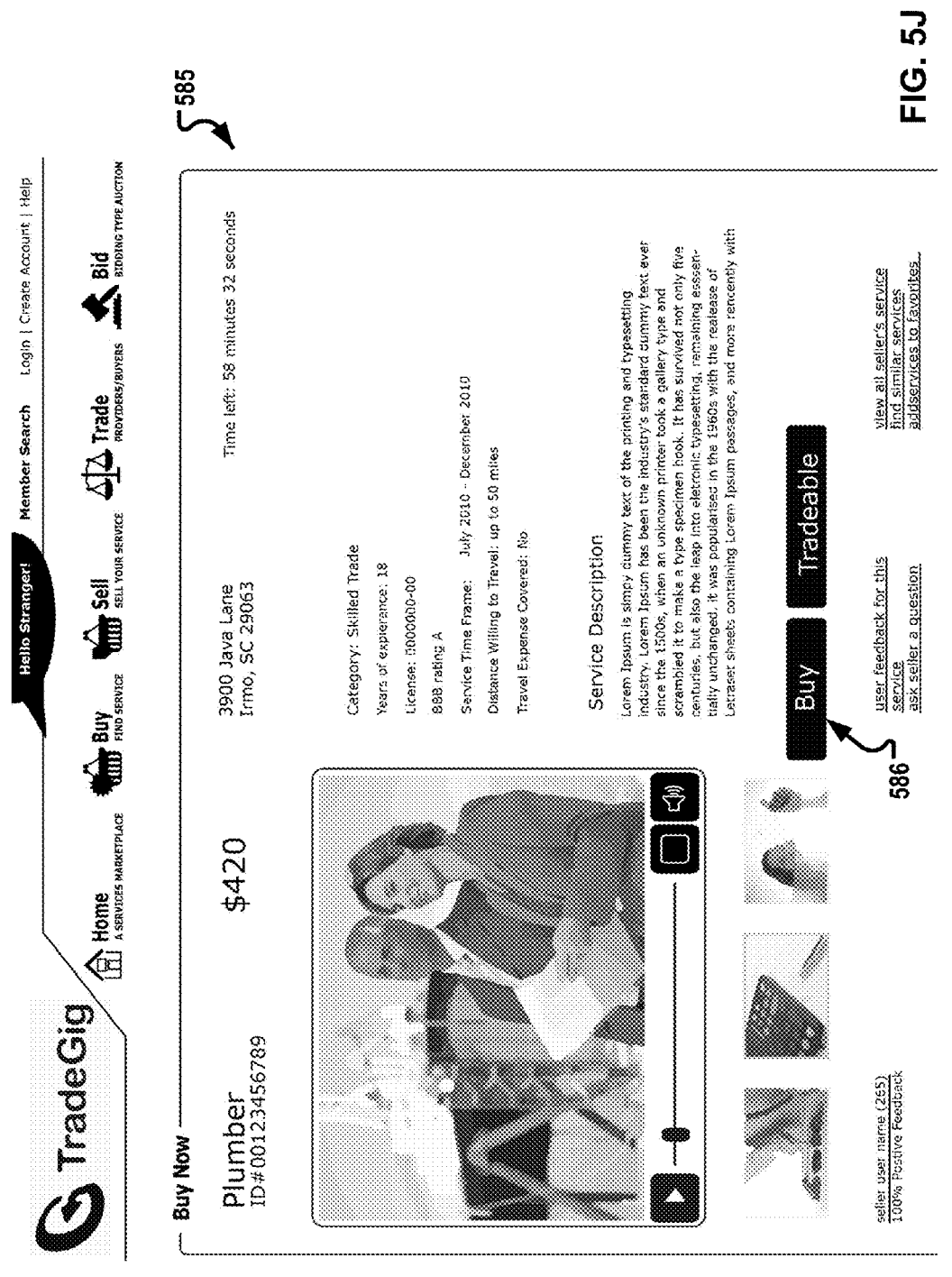
Figure 5K:
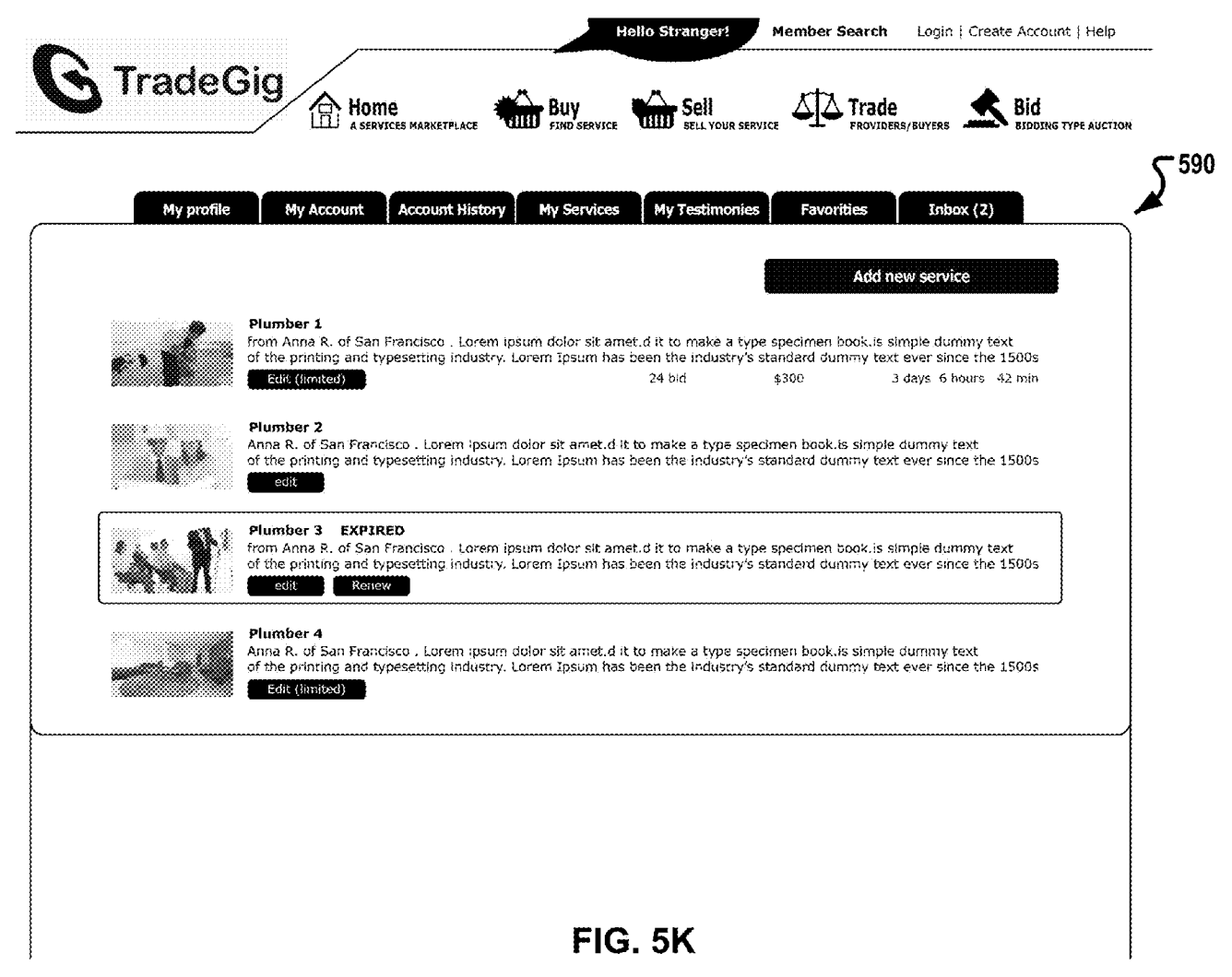
Figure 5L:
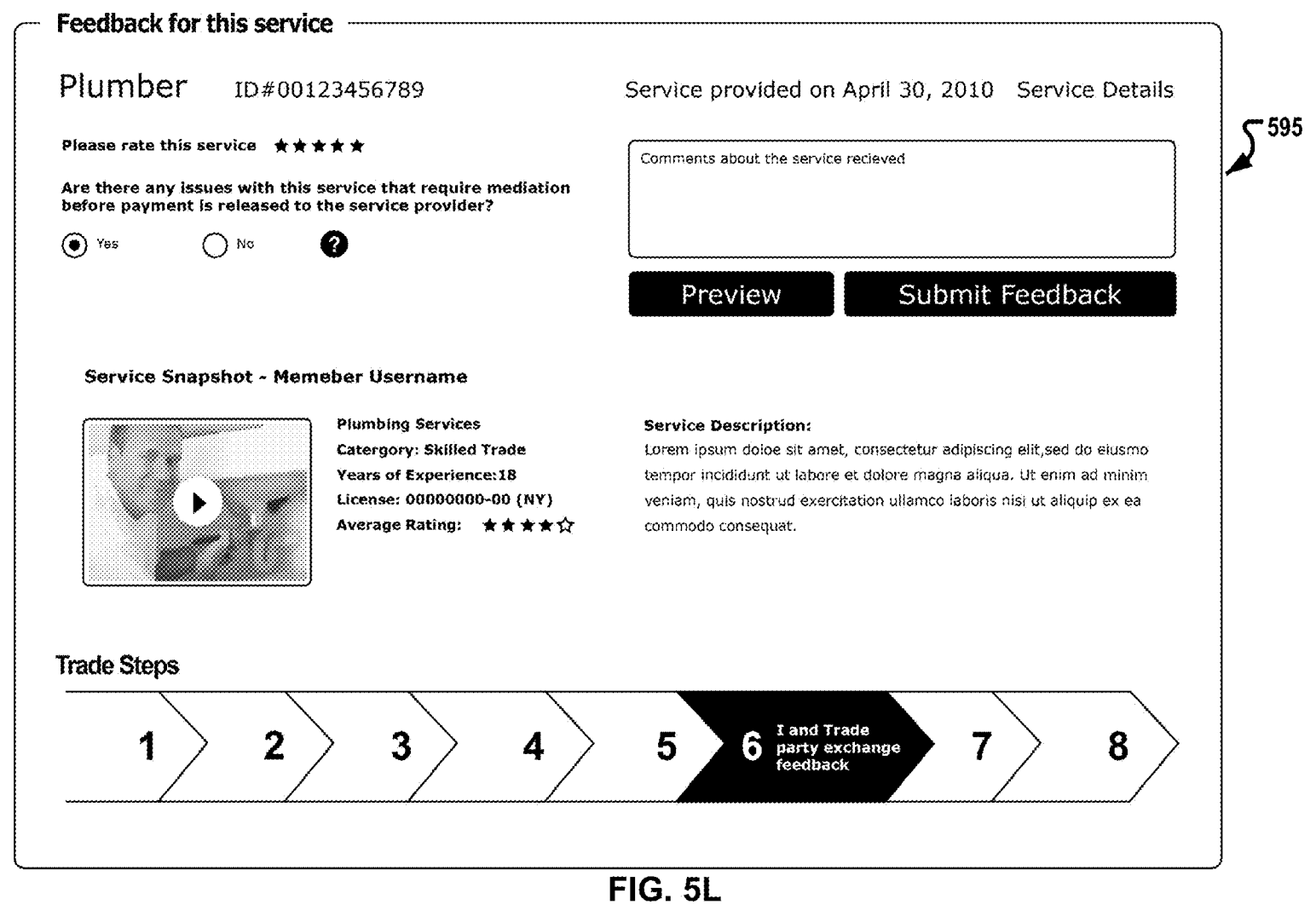

FIG. 5G is an exemplary screenshot of a service summary page 560 that can be displayed over a feedback page 590 shown in FIG. 5L. As shown, the service summary page 560 can include information identifying the summary of a service purchased. For example, the service summary page 560 can include the date on which the service was rendered, the price value of the service (e.g., the cash value and the points value), the location at which the service was rendered, and the payment method. In some implementations, the service summary page 560 also can include a link "View Service Detail" to direct a user to view more detail regarding the service rendered, or a link "View Purchased Service" to direct the user to view his/her own profile listing all services that have been purchased by the user.

FIG. 5H is an exemplary screenshot of a search results page 570. As shown, users can search, using a search panel, to locate one or more desired services. For example, the user can specify the category of the service desired, or options that include locating services that are "Tradeable", service providers that are "BBB+ rated", service listings specifying "Buyer-paid Travel Cost". The search results page 570 also can include a "Bids only" tab for displaying search results of service listings that are open only for auction, and a "Trade only" tab for displaying search results of service listings that are open for trade only.

FIG. 5I is an exemplary screenshot of a service listing 580. As shown, in creating the service listing 580, a service provider can specify one or more service-related criteria associated with a specific service to be rendered. For example, the service listing 580 can include options specifying whether the service to be listed is "one-time only" (e.g., where the service listing will expire once the auction closes), "continuous" (e.g., where the service listing will expire only after a predetermined period), "tradeable" (e.g., whether the service provider accepts trade from other service providers), or "Private Invitation Only" (e.g., where the service listing is open for bids from invited users but otherwise is closed to the general public. The user also can specify the form of payment or method of payment in the service listing 580.

FIG. 5J is an exemplary screenshot of a buy-now page 585. As shown, the buy-now page 585 allows a buyer to immediately buy the service listed in the buy-now page 585 (e.g., by clicking on the "Bid" button 586).

FIG. 5K is an exemplary screenshot of a service summary page 590. In some implementations, the service summary page 590 can be accessed once the user has logged into the networked system 102. As shown, the service summary page 590 can display all of the user's existing, active services that are currently being auctioned off (or traded). The service summary page 590 also can display expired service listings where the auction period of a service listing has expired or where the service has been rendered and transaction completed.

FIG. 5L is an exemplary screenshot of a feedback page 595. In some implementations, the feedback page 595 can be displayed during a feedback phase where a buyer provides feedback to a service provider who has rendered a specific service to the buyer. In some implementations, after the auctioned service has been rendered, the buyer can be requested to provide feedback on and rate the service provided using the feedback page 595. The networked system 102 can keep track of all feedbacks and ratings that can be posted onto the buyer and the service provider's user profile, which can be accessed by the general public.

As discussed above, a system and a method can be used for facilitating an auction, wherein consumers can use points (or cash or other currency) to purchase services from service providers. In some implementations, consumers also can use points (or cash or other currency) to place bids on services offered by the services providers, wherein winning bidders purchase the services from the providers with points, cash, or combination thereof. While various types of auctions exist and provide various methods for facilitating payment for services bid on and won during an auction, the networked system 102 enables consumers to redeem points in exchange for services offered for auction by other users and services providers.

In some implementations, a service based organization can offer services for specific date and time slots. For example, through analysis, an accounting firm may determine that the billable hours for its accountants are consistently low during the second week of each month. As such, the accounting firm may choose to participate in a calendar auction, wherein it may offer its accounting services at a discount during the second week of each month. Potential buyers and bidders can search for such services that are available during specific date and time slots, and apply a balance of points and cash toward a bid for the offered services.

Points can be earned and redeemed in any number of ways. Moreover, other methods of providing an incentive can be used other than points in order to drive consumer spending. Issuing coupons based on a consumers spending history, for example, is one such method. Although an auction is disclosed herein in conjunction with the redemption of points, cash or a combination thereof, the subject matter described herein should not be construed as limiting. Other mediums having a monetary value or no monetary value also can be used to place and/or accept bids within the disclosed online auction.

Points also can be earned or issued based on the value of a purchase, a purchase quantity, a purchase location, participation in an event, and the like. Points can further be accumulated by an owner of a registered account based on such activities and/or by accepting a transfer of a balance of points from another account. Such transfer can be initiated by an owner of a first account for the benefit of the owner of a second account. Points can be transferred between a number of accounts owned by the same individual. Such a transfer can be a one-to-one point transfer, or can involve a point value and type conversion from a first value and type to a second value and type.

While the aforementioned implementations are described with respect to service auctions, one skill in the art would readily recognize that the implementations described herein also can be applied to traditional auctions, online auctions, open auctions, closed auctions, auctions for charity, product auctions, or any combination thereof.

Generic Computer System

Figure 6:
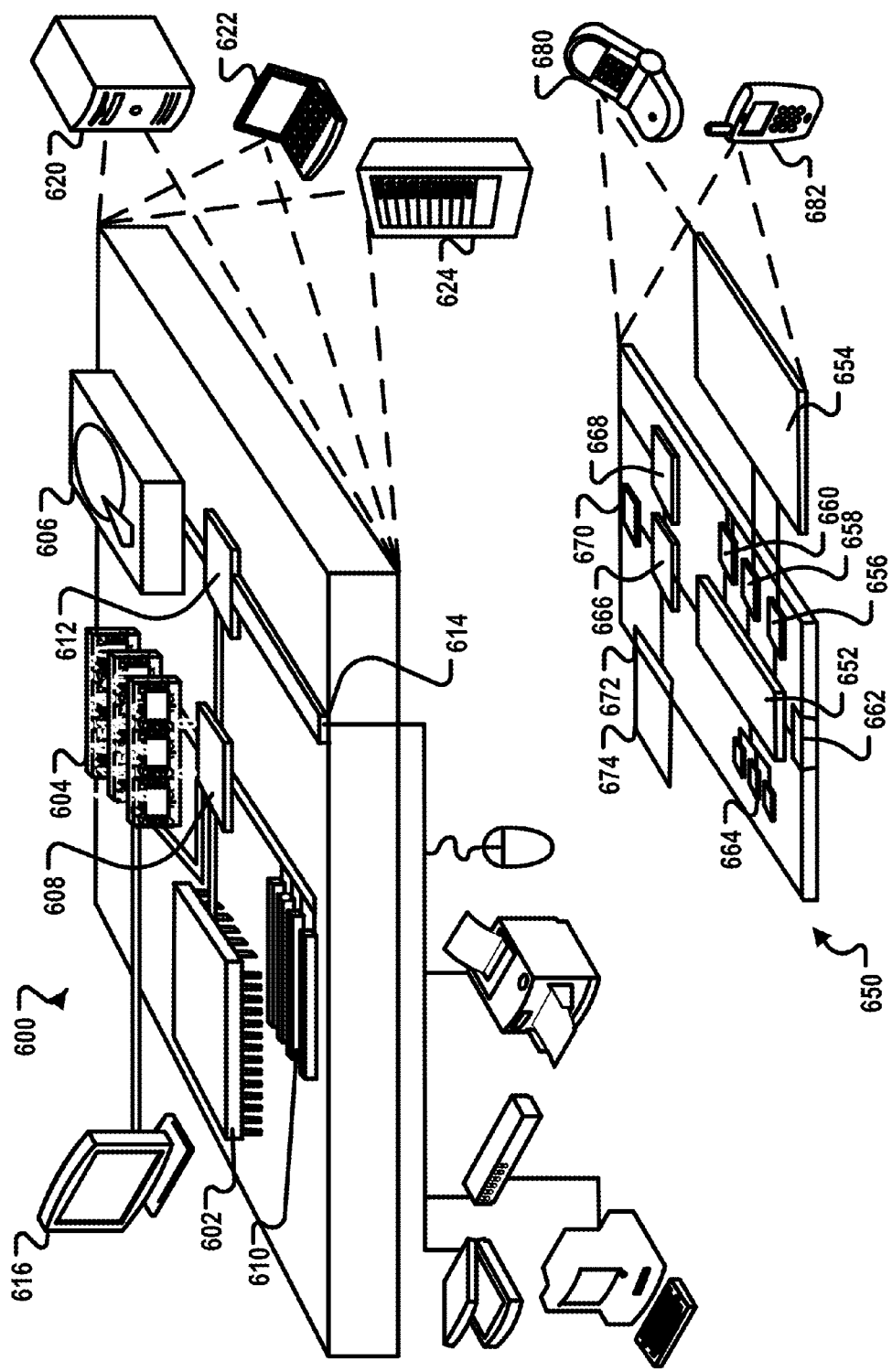
FIG. 6 shows an example of a computing device and a mobile computing device that can be used to implement the subject matter described herein.

FIG. 6 shows an example of a computing device 600 and a mobile computing device 650 that can be used to implement the subject matter described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 can also be another form of computer-readable medium, such as a magnetic or optical disk.

The storage device 606 is capable of providing mass storage for the computing device 600. In some implementations, the storage device 606 can be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which can accept various expansion cards (not shown). In the implementation, the low-speed interface 612 is coupled to the storage device 606 and the low-speed expansion port 614. The low-speed expansion port 614, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the FIGURES For example, it can be implemented as a standard server 620, or multiple times in a group of such servers. In addition, it can be implemented in a personal computer such as a laptop computer 622. It can also be implemented as part of a rack server system 624. Alternatively, components from the computing device 600 can be combined with other components in a mobile device (not shown), such as a mobile computing device 650. Each of such devices can contain one or more of the computing device 600 and the mobile computing device 650, and an entire system can be made up of multiple computing devices communicating with each other.

The mobile computing device 650 includes a processor 652, a memory 664, an input/output device such as a display 654, a communication interface 666, and a transceiver 668, among other components. The mobile computing device 650 can also be provided with a storage device, such as a microdrive or other device, to provide additional storage. Each of the processor 652, the memory 664, the display 654, the communication interface 666, and the transceiver 668, are interconnected using various buses, and several of the components can be mounted on a common motherboard or in other manners as appropriate.

The processor 652 can execute instructions within the mobile computing device 650, including instructions stored in the memory 664. The processor 652 can be implemented as a chipset of chips that include separate and multiple analog and digital processors. The processor 652 can provide, for example, for coordination of the other components of the mobile computing device 650, such as control of user interfaces, applications run by the mobile computing device 650, and wireless communication by the mobile computing device 650.

The processor 652 can communicate with a user through a control interface 658 and a display interface 656 coupled to the display 654. The display 654 can be, for example, a TFT (Thin-Film-Transistor Liquid Crystal Display) display or an OLED (Organic Light Emitting Diode) display, or other appropriate display technology. The display interface 656 can comprise appropriate circuitry for driving the display 654 to present graphical and other information to a user. The control interface 658 can receive commands from a user and convert them for submission to the processor 652. In addition, an external interface 662 can provide communication with the processor 652, so as to enable near area communication of the mobile computing device 650 with other devices. The external interface 662 can provide, for example, for wired communication in some implementations, or for wireless communication in other implementations, and multiple interfaces can also be used.

The memory 664 stores information within the mobile computing device 650. The memory 664 can be implemented as one or more of a computer-readable medium or media, a volatile memory unit or units, or a non-volatile memory unit or units. An expansion memory 674 can also be provided and connected to the mobile computing device 650 through an expansion interface 672, which can include, for example, a SIMM (Single In Line Memory Module) card interface. The expansion memory 674 can provide extra storage space for the mobile computing device 650, or can also store applications or other information for the mobile computing device 650. Specifically, the expansion memory 674 can include instructions to carry out or supplement the processes described above, and can include secure information also. Thus, for example, the expansion memory 674 can be provide as a security module for the mobile computing device 650, and can be programmed with instructions that permit secure use of the mobile computing device 650. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652) (e.g., which can be non-transitory). In some implementations, the instructions can be received, for example, over the transceiver 668 or the external interface 662.

The mobile computing device 650 can communicate wirelessly through the communication interface 666, which can include digital signal processing circuitry where necessary. The communication interface 666 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 668 using a radio-frequency. In addition, short-range communication can occur, such as using a Bluetooth, WiFi, or other such transceiver (not shown). In addition, a GPS (Global Positioning System) receiver module 670 can provide additional navigation- and location-related wireless data to the mobile computing device 650, which can be used as appropriate by applications running on the mobile computing device 650.

The mobile computing device 650 can also communicate audibly using an audio codec 660, which can receive spoken information from a user and convert it to usable digital information. The audio codec 660 can likewise generate audible sound for a user, such as through a speaker, e.g., in a handset of the mobile computing device 650. Such sound can include sound from voice telephone calls, can include recorded sound (e.g., voice messages, music files, etc.) and can also include sound generated by applications operating on the mobile computing device 650.

The mobile computing device 650 can be implemented in a number of different forms, as shown in the figure. For example, it can be implemented as a cellular telephone 680. It can also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) can be employed by other applications implemented by one or more processors, such as an application executing on one or more servers.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

While this specification contains many specifics, these should not be construed as limitations on the scope of what can be claimed, but rather as descriptions of features that can be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations.

A number of embodiments of the invention have been described. Nevertheless, it will be understood that various modifications can be made without departing from the spirit and scope of the invention. Accordingly, other embodiments are within the scope of the following claims.

What is claimed is:

1. A method comprising:

receiving, by a processor, valuation information that includes at least one of a first parameter or a second parameter from a first entity associated with a service, the first parameter associated with a first format and the second parameter associated with a second format, wherein the first format is associated with a non-virtual format and the second format is associated with a virtual format;

setting, by the processor, a conversion relationship based on the valuation information that includes at least one of the first parameter or the second parameter, the conversion relationship configured to convert parameters associated with the first format to the second format, or parameters associated with the second format to the first format;

receiving, from the first entity, an offer value associated with the service, the offer value associated with at least one of the first format or the second format;

receiving, from a second entity different from the first entity, a request associated with obtaining the service including receiving a third parameter and a fourth parameter with the request, the third parameter associated with the first format and the fourth parameter associated with the second format; and processing, by the processor, the request including the third parameter and the fourth parameter based on the conversion relationship to determine whether the third parameter and the fourth parameter meet the offer value.

2. The method of claim 1, further comprising:

recording the request when the third parameter and the fourth parameter meet the offer value.

3. The method of claim 1, wherein setting the conversion relationship is performed to allow values in monetary format or values in non-monetary format to be converted into values in the non-monetary format or values in the monetary format, respectively.

4. The method of claim 3, wherein:

receiving at least one of the first parameter or the second parameter includes receiving the first parameter in the monetary format or the second parameter in the non-monetary format;

receiving the third parameter and the fourth parameter includes receiving the third parameter in the monetary format and the fourth parameter in the non-monetary format; and processing the request includes processing the first parameter, the second parameter, the third parameter, and the fourth parameter based on the conversion relationship to determine whether the third parameter and the fourth parameter satisfy the first parameter and the second parameter.

5. A method comprising:

receiving, by a processor, a listing from a first entity, the listing providing a service or good and having an offer value, the offer value definable using at least one of a monetary format or a non-monetary format;

receiving, from a second entity different from the first entity, a request associated with obtaining the service or good including receiving a first value from the second entity, the first value having a first format selected from one of the monetary format or the non-monetary format;

determining, by the processor, whether the first value satisfies the offer value based on a conversion relationship, the conversion relationship configured to convert parameters associated with the monetary format to the non-monetary format, or parameters associated with the non-monetary format to the monetary format;

communicating, by the processor to the second entity, an outcome of the determination;

receiving, by the processor, a second value different from the first value from the second entity if it is determined, based on the conversion relationship, that the first value fails to satisfy the offer value, the second value having a second format different from the first format and selected from one of the monetary format or the non-monetary format; and recording, by the processor, the request when the first value and the second value satisfy the offer value.

6. The method of claim 5, further comprising:

receiving the request associated with obtaining the offer includes receiving a request from the second entity to be processed as a service transaction through which the first entity obtains a service or good associated with the second entity and the second entity obtains the service or good associated with the first entity, the request including information associated with the service or good associated with the second entity, the service or good associated with the second entity having a tradable value defined by at least one of a monetary value or a non-monetary value.

7. The method of claim 5, wherein determining includes determining that the first value and the second value fail to satisfy the offer value, the method further comprising:

notifying the first entity that the first value and the second value fail to satisfy the offer value; and receiving, in response to the notification, a request to proceed with recording the request from the first entity, wherein recording the request is performed based on the request from the first entity.

8. The method of claim 5, wherein:

receiving the request from the second entity includes receiving a counteroffer as the request, the counteroffer specifying the first value and the second value from the second entity, wherein the first value and the second value is not equal to the offer value;

determining whether the first value and the second value satisfy the offer value includes determining whether a confirmation has been received from the first entity to accept the counteroffer from the second entity; and recording the request is performed based on the confirmation from the first entity.

9. The method of claim 5, wherein receiving the request includes receiving the request in a bid, the method further comprising:

receiving a bid from a third entity to obtain the service or good associated with the first entity, the bid from the third entity including a third value in the monetary format and a fourth value in the non-monetary format, wherein:

determining whether the first value and the second value satisfy the offer value includes determining whether a sum of the first value and the second value satisfies the offer value and whether the sum of the first value and the second value exceeds a sum of the third value and the fourth value; and recording the request with respect to the first entity and the second entity is performed when the sum of the first value and the second value satisfies the offer value and exceeds the sum of the third value and the fourth value.

10. The method of claim 5, wherein:
receiving the first value includes the first value in the non-monetary format from the second entity; and
receiving the second value includes receiving the second value in the monetary format from the second entity, the second value in the monetary format representative of a difference between the first value in the non-monetary format and the offer value.

11. The method of claim 5, wherein:
receiving the first value includes the first value in the monetary format from the second entity; and
receiving the second value includes receiving the second value in the non-monetary format from the second entity, the second value in the non-monetary format representative of a difference between the first value in the monetary format and the offer value.

12. The method of claim 5, wherein receiving the first value from the second entity includes receiving the first value from an account associated with the second entity.

13. A system comprising:
a processor; and
a memory coupled to the processor and storing instructions, which, when executed by the processor, causes the processor to perform operations comprising:
receiving valuation information that includes at least one of a first parameter or a second parameter from a first entity associated with a service, the first parameter associated with a first format and the second parameter associated with a second format, wherein the first format is associated with a non-virtual format and the second format is associated with a virtual format;
setting a conversion relationship based on the valuation information that includes at least one of the first parameter or the second parameter, the conversion relationship configured to convert parameters associated with the first format to the second format, or parameters associated with the second format to the first format;
receiving, from the first entity, an offer value associated with the service, the offer value associated with at least one of the first format or the second format;
receiving, from a second entity different from the first entity, a request associated with obtaining the service including receiving a third parameter and a fourth parameter with the request, the third parameter associated with the first format and the fourth parameter associated with the second format; and
processing the request including the third parameter and the fourth parameter based on the conversion relationship to determine whether the third parameter and the fourth parameter meet the offer value.

14. The system of claim 13, wherein the memory further includes instructions which, when executed by the processor, cause the processor to perform operations comprising:
recording the request when the third parameter and the fourth parameter meet the offer value.

15. The system of claim 13, wherein the instructions cause the processor to set the conversion relationship to allow values in monetary format or values in non-monetary format to be converted into values in the non-monetary format or values in the monetary format, respectively.

16. The system of claim 13, wherein the instructions cause the processor to:
receive the first parameter in the monetary format or the second parameter in the non-monetary format;
receive the third parameter in the monetary format and the fourth parameter in the non-monetary format; and
process the first parameter, the second parameter, the third parameter, and the fourth parameter based on the conversion relationship to determine whether the third parameter and the fourth parameter satisfy the first parameter and the second parameter.

* * * * *